US012679216B1

(12) United States Patent
Wilcox

(10) Patent No.: US 12,679,216 B1
(45) Date of Patent: Jul. 14, 2026

(54) WAVE-POWERED UNMANNED UNDERSEA VEHICLE

(71) Applicant: The United States of America, as represented by the Secretary of the Navy, Arlington, VA (US)

(72) Inventor: Benjamin Wilcox, Camarillo, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 352 days.

(21) Appl. No.: 18/430,346

(22) Filed: Feb. 1, 2024

(51) Int. Cl.
| | |
|---|---|
| *B60L 8/00* | (2006.01) |
| *B60L 53/22* | (2019.01) |
| *B63G 8/08* | (2006.01) |
| *B63G 8/16* | (2006.01) |
| *F03B 13/14* | (2006.01) |

(Continued)

(52) U.S. Cl.
CPC ................. *B60L 8/00* (2013.01); *B60L 53/22* (2019.02); *B63G 8/08* (2013.01); *B63G 8/16* (2013.01); *F03B 13/14* (2013.01); *H02J 7/14* (2013.01); *H02J 7/855* (2026.01); *B60L 2200/32* (2013.01); *B60L 2210/30* (2013.01); *F05B 2220/7064* (2013.01); *H02J 2207/20* (2020.01)

(58) Field of Classification Search
CPC ........ B60L 8/00; B60L 53/22; B60L 2210/30; B60L 2200/32; H02J 7/855; H02J 7/14; H02J 2207/30; B63G 8/00; B63G 8/08; B63G 8/16; F03B 13/10; F03B 13/14
USPC ................................................. 114/337, 338
See application file for complete search history.

(56) References Cited

U.S. PATENT DOCUMENTS

| | | |
|---|---|---|
| 7,323,790 B2 | 1/2008 | Taylor et al. |
| 7,921,795 B2 | 4/2011 | Imlach et al. |

(Continued)

FOREIGN PATENT DOCUMENTS

| | | |
|---|---|---|
| WO | WO2018/023051 | 2/2018 |
| WO | WO2022261109 | 12/2022 |

OTHER PUBLICATIONS

Michael E. Mccormick, Wave Energy Conversion, Dover, 2007, United States.

(Continued)

*Primary Examiner* — Lars A Olson
(74) *Attorney, Agent, or Firm* — Naval Facilities Engineering and Expeditionary Warfare Center; Jimmy M. Sauz

(57) ABSTRACT

A waved-powered UUV. The wave-powered UUV may comprise a nose and body. The nose may comprise a nose buttress plate and guide shaft. The body may comprise a body buttress plate having first and second clearance openings; linear-to-rotary power converter (LRPC) having a splined shaft attached to the nose buttress plate and longitudinally disposed through the first clearance opening; AC generator operably coupled to the LRPC; AC-DC converter electrically coupled to the AC generator; battery module electrically coupled to the AC-DC converter; DC motor electrically coupled to the battery module; propeller operably coupled to the DC motor; and guide shaft tube attached to the second clearance opening for receiving the guide shaft. The nose and body may be in a sliding relationship, and the wave-powered UUV may recharge its battery module when subject to wave energy by moving the nose relative to the body in a reciprocal linear motion.

20 Claims, 15 Drawing Sheets

(51) Int. Cl.
    *H02J 7/00*        (2006.01)
    *H02J 7/14*        (2006.01)

(56)            References Cited

U.S. PATENT DOCUMENTS

| | | |
|---|---|---|
| 8,205,570 B1 | 6/2012 | Tureaud et al. |
| 8,397,658 B1 | 3/2013 | Imlach et al. |
| 10,908,250 B1 | 2/2021 | Dudinsky et al. |
| 2013/0068153 A1 | 3/2013 | Hine |
| 2015/0203183 A1* | 7/2015 | Ambs ..................... F03B 13/14 |
| | | 60/495 |
| 2018/0030953 A1 | 2/2018 | Stapelmann |

OTHER PUBLICATIONS

Wikipedia, Salter's duck, United States https://en.wikipedia.org/wiki/Salter%27s_duck.

Bardex Corporation, Bardex Paravane Generator, YouTube, May 2023, United States https://www.youtube.com/watch?v=Qo61HISK-u4.

Wikipedia, Ballast Tank, webpage, United States https://en.wikipedia.org/wiki/Ballast_tank.

Nichols et al., Unmanned Vehicle Systems & Operations on Air, Sea, and Land, book, Chapter 4, New Prairie Press, 2020, Manhattan, KS, United States https://kstatelibraries.pressbooks.pub/nicholsproject/.

Standards and Curriculum Division Training, Bureau of Naval Personnel, The Fleet Type Submarine Online, book, Jun. 1946, NavPers 16160, San Franciso Maritime National Park Association, United States https://maritime.org/doc/fleetsub/index.php.

Advanced Acoustic Concepts—A DRS/THALES Company, Synthetic Aperture & Mine Detection Imaging Sonar (SAMDIS), brochure, Jan. 2017, Advanced Acoustic Concepts, United States https://sldinfo.com/whitepapers/the-samdis-solution-to-mine-detection/.

Mccormick, Ocean Wave Energy Concepts, 1979, United States https://www.academia.edu/32997665/Ocean_Wave_Energy_Concepts.

* cited by examiner

110

270

120

1000

130

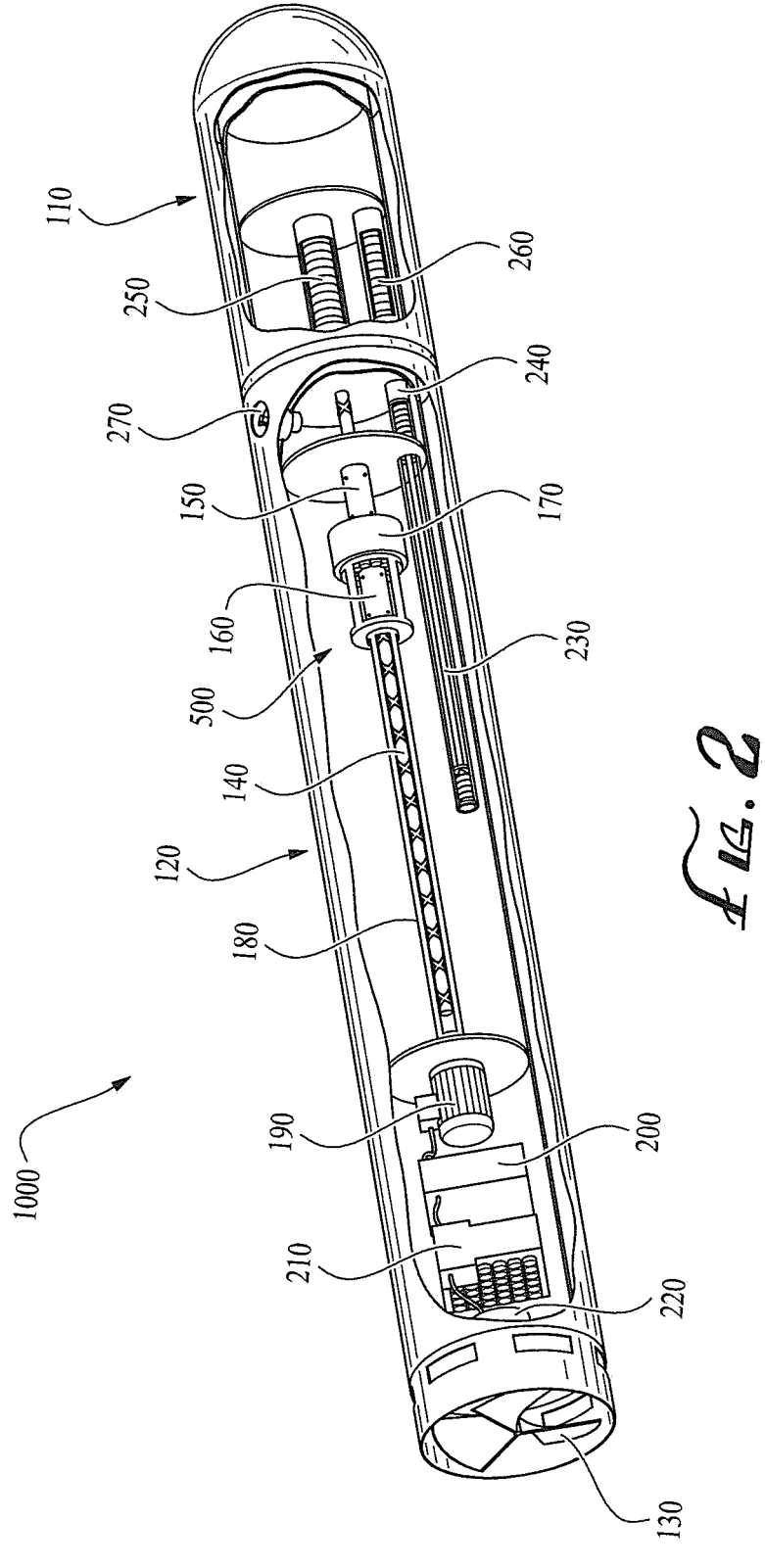
_Fig. 2_

SEC. A

1000

SEC. A

SEC. B

SEC. B

1000

SEC. B

SEC. B

SEC. B

1000

270

120

150

151

330

170

500

382

162

160

320

180

140

140b

140a

269

240

233

230

290

340

122

160a

313

123

185

232

234

SEC. C

1000

140
192
120
193
202
212
130

180
190
122
200
210
220

WAVE-POWERED UNMANNED UNDERSEA VEHICLE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to unmanned undersea vehicles (UUVs) having a recharging mechanism utilizing wave energy.

BACKGROUND

UUVs are often used in various applications in maritime environments that are unsuitable, costly, or dangerous to humans. Such applications may include patrolling, surveillance, and oceanic research. UUVs, for instance, may be used to survey a seabed autonomously from a vantage point of a vessel.

Due to battery power constraints, the mission scope of a UUV is generally limited. These limitations affect propulsion duration and operating ranges. As a result, the operating regions of the UUVs are usually restricted to areas proximate to the operator. Because much time and effort may be spent deploying and retrieving a UUV to and from the ocean, it is often desirable for the UUV to have a battery recharging mechanism without having to manually retrieve the UUV from the ocean.

Therefore, based on the foregoing, a need exists that overcomes these deficiencies. The present disclosure solves these deficiencies and generally represents a new and useful innovation in recharging mechanisms for UUVs.

SUMMARY OF ILLUSTRATIVE EMBODIMENTS

To minimize the limitations in the related art and other limitations that will become apparent upon reading and understanding the present specification, the following discloses embodiments of a new and useful wave-powered unmanned undersea vehicle (UUV).

One embodiment may be a wave-powered UUV, comprising: a nose, comprising: a nose buttress plate; and a guide shaft having a first end attached to the nose buttress plate; and a body, comprising: a body buttress plate having first and second clearance openings; a linear-to-rotary power converter (LRPC) having a splined shaft longitudinally disposed through the first clearance opening and a drivetrain configured to rotate when the splined shaft moves in a reciprocal linear motion; an alternating current (AC) generator having a drive shaft fixedly coupled to the drivetrain and configured to convert a rotational energy of the drivetrain into an AC voltage; an AC-DC converter electrically coupled to the AC generator and configured to convert the AC voltage into a direct current (DC) voltage; a battery module electrically coupled to the AC-DC converter and configured to receive and store the DC voltage from the AC-DC converter and provide the DC voltage to a battery module output; a DC motor electrically coupled to the battery module output and configured to rotate a propeller shaft when receiving the DC voltage; a propeller attached to the propeller shaft and configured to propel the wave-powered UUV within a body of water when the DC motor drives the propeller shaft; and a guide shaft tube, longitudinally disposed within the body and fixedly attach to the second clearance opening; wherein a second end of the guide shaft may be slidably coupled into the guide shaft tube, such that the nose and the body are in a sliding relationship; and wherein a first end of the splined shaft may be attached to the nose buttress plate of the nose and may be configured to move in the reciprocal linear motion having an upward stroke in a first linear direction and a downward stroke in a second linear direction opposite to the first linear direction. The splined shaft may include first and second splined shaft helical grooves diametrically opposed to each other; and wherein the LRPC may further comprise: a top clutch operably coupled to the splined shaft and configured to (1) rotate a first direction when the splined shaft performs the upward stroke and (2) rotate a second direction when the splined shaft performs the downward stroke, the top clutch having a top clutch inner race portion and a top clutch helical groove disposed therein; a bottom clutch operably coupled to the splined shaft and configured to (1) rotate the second direction when the splined shaft performs the upward stroke and (2) rotate the first direction when the splined shaft performs the downward stroke, the bottom clutch having a bottom clutch inner race portion and a bottom clutch helical groove disposed therein; top clutch helical roller bearings protruding helically inward into both the top clutch helical groove and the first splined shaft helical groove, such that the top clutch helical roller bearings may be rotatably disposed between the top clutch and the splined shaft; bottom clutch helical roller bearings protruding helically inward into both the bottom clutch helical groove and the second splined shaft helical groove, such that the bottom clutch helical roller bearings may be rotatably disposed between the bottom clutch and the splined shaft; and a flywheel having top and bottom clutch outer race portions on opposing sides, the top clutch outer race portion being operably coupled to the top clutch inner race portion via top clutch sprags and the bottom clutch outer race portion being operably coupled to the bottom clutch inner race portion via bottom clutch sprags, such that the flywheel may be disposed adjacently between the top clutch and the bottom clutch; wherein a first end of the drivetrain is fixedly attached to the flywheel and a second end is fixedly coupled to the drive shaft of the AC generator, such that when the flywheel rotates, the drive shaft rotates. The drivetrain may comprise: a flywheel connector fixedly coupled to the flywheel; and a generator coupler having a first end fixedly coupled to the flywheel connector and a second end fixedly coupled to the drive shaft of the AC generator. The bottom clutch helical groove may be a right-hand helical groove, and wherein the top clutch helical groove may be a left-hand helical groove. The wave-powered UUV may further comprise a splined shaft baffle having a first end portion and a second end portion, the first end portion being sealaby coupled to the nose and the second end portion being scalably coupled to the body, wherein at least a portion of the splined shaft may be disposed within the splined shaft baffle; and a guide shaft baffle having a first end portion and a second end portion, the first end portion being scalably coupled to the nose and the second end portion being scalably coupled to the body, wherein at least a portion of the guide shaft may be disposed within the guide shaft baffle. The wave-powered UUV may further comprise: a journal bearing coupled to the guide shaft tube and slidably engaged with the guide shaft; a first impact spring disposed within a first end portion of the guide shaft tube; and a second impact spring disposed within the second end portion of the guide shaft tube; wherein a second end of the guide shaft may comprise an end stop disposed between the first impact spring and the second impact spring within the guide shaft tube, such that the end stop may be configured to contact the first impact spring when the nose is substantially away from the body and contact the second impact spring when the nose is close or adjacent to the body. The wave-powered UUV may further comprise: an attitude motor, an attitude propeller operably coupled to the attitude motor; and an attitude control system configured to actuate the attitude propeller and attitude motor in order to adjust an attitude of the wave-powered UUV when the wave-powered UUV is maneuvering in the body of water.

Another embodiment may be a wave-powered UUV, comprising: a nose, comprising: a nose buttress plate; first and second shaft tubes, each having a first end attached to the nose buttress plate and an open second end; and a guide shaft having a first end attached to the nose buttress plate and disposed within the second shaft tube; a body, comprising: a hull, substantially elongate and having a fore end and an aft end; a body buttress plate disposed near the fore end of the hull and having first and second clearance openings; an LRPC having a splined shaft longitudinally disposed through the first clearance opening and a drivetrain configured to rotate when the splined shaft moves in a reciprocal linear motion; an AC generator having a drive shaft operably coupled to the drive train and configured to convert a rotational energy of the drivetrain into an AC voltage; an AC-DC converter electrically coupled to the AC generator and configured to convert the AC voltage into a DC voltage; a battery module electrically coupled to the AC-DC converter and configured to receive and store the DC voltage from the AC-DC converter and provide the DC voltage to a battery module output; a DC motor electrically coupled to the battery module output and configured to rotate a propeller shaft when receiving the DC voltage; a propeller coupled to the propeller shaft and configured to propel the wave-powered UUV within a body of water when the DC motor drives the propeller shaft; and a guide shaft tube, longitudinally disposed within the body and fixedly attach to the second clearance opening; wherein a second end of the guide shaft may be slidably coupled to guide shaft tube, such that the nose and the body may be in a sliding relationship; and wherein a first end of the splined shaft may be attached to the nose buttress plate of the nose and disposed within the first shaft tube, the splined shaft being movable in a reciprocal linear motion having an upward stroke in a first linear direction and a downward stroke in a second linear direction opposite to the first linear direction. The splined shaft may include first and second splined shaft helical grooves diametrically opposed to each other; and wherein the LRPC may further comprise: a top clutch operably coupled to the splined shaft and configured to (1) rotate a first direction when the splined shaft performs the upward stroke and (2) rotate a second direction when the splined shaft performs the downward stroke, the top clutch having a top clutch inner race portion and a top clutch helical groove disposed therein; a bottom clutch operably coupled to the splined shaft and configured to (1) rotate the second direction when the splined shaft performs the upward stroke and (2) rotate the first direction when the splined shaft performs the downward stroke, the bottom clutch having a bottom clutch inner race portion and a bottom clutch helical groove disposed therein; top clutch helical roller bearings protruding helically inward into both the top clutch helical groove and the first splined shaft helical groove, such that the top clutch helical roller bearings may be rotatably disposed between the top clutch and the splined shaft; bottom clutch helical roller bearings protruding helically inward into both the bottom clutch helical groove and the second splined shaft helical groove, such that the bottom clutch helical roller bearings may be rotatably disposed between the bottom clutch and the splined shaft; and a flywheel having top and bottom clutch outer race portions on opposing sides, the top clutch outer race portion being operably coupled to the top clutch inner race portion via top clutch sprags and the bottom clutch outer race portion being operably coupled to the bottom clutch inner race portion via bottom clutch sprags, such that the flywheel may be disposed adjacently between the top clutch and the bottom clutch; wherein a first end of the drivetrain may be fixedly attached to the flywheel and a second end may be fixedly coupled to the drive shaft of the AC generator, such that when the flywheel rotates, the drive shaft may rotate. The drivetrain may comprise: a flywheel connector fixedly coupled to the flywheel; and a generator coupler having a first end fixedly coupled to the flywheel connector and a second end fixedly coupled to the drive shaft of the AC generator. The bottom clutch helical groove may be a right-hand helical groove and wherein the top clutch helical groove may be a left-hand helical groove. The wave-powered UUV may further comprise a splined shaft baffle having a first end portion and a second end portion, the first end portion being sealaby coupled to the nose and disposed within the first shaft tube and the second end portion being sealably coupled to the body, wherein at least a portion of the splined shaft may be disposed within the splined shaft baffle and a guide shaft baffle having a first end portion and a second end portion, the first end portion being scalably coupled to the nose and disposed within the second shaft tube and the second end portion being scalably coupled to the body, wherein at least a portion of the guide shaft may be disposed within the guide shaft baffle. The wave-powered UUV may further comprise: a journal bearing coupled to the guide shaft tube and slidably engaged with the guide shaft; a first impact spring disposed within a first end portion of the guide shaft tube; and a second impact spring disposed within the second end portion of the guide shaft tube; wherein a second end of the guide shaft may comprise an end stop disposed between the first impact spring and the second impact spring within the guide shaft tube, such that the end stop may be configured to contact the first impact spring when the nose is substantially away from the body and contact the second impact spring when the nose is close or adjacent to the body. The wave-powered UUV may further comprise: an attitude motor, an attitude propeller operably coupled to the attitude motor; and an attitude control system configured to actuate the attitude propeller and attitude motor in order to adjust an attitude of the wave-powered UUV when the wave-powered UUV is maneuvering in the body of water.

Another embodiment may be a wave-powered UUV, comprising: a nose, comprising: a nose buttress plate; first and second shaft tubes, each having a first end attached to the nose buttress plate and an open second end; and a guide shaft having a first end attached to the nose buttress plate and disposed within the second shaft tube; and a body, comprising: a hull, substantially elongate and having a fore end and an aft end, the hull, comprising an inner hull and an outer hull; a ballast control system disposed between the inner hull and the outer hull; a body buttress plate disposed near a fore end portion of the hull and having first and second clearance openings; an LRPC having a splined shaft longitudinally disposed through the first clearance opening and a drivetrain configured to rotate when the splined shaft moves in a reciprocal linear motion, the LRPC being configured to convert reciprocating linear energy from the splined shaft to continuous rotational energy at the drivetrain; an AC generator having a drive shaft operably coupled to the drivetrain and configured to convert the continuous rotational energy into an AC voltage; an AC-DC converter electrically coupled to the AC generator and configured to convert the AC voltage into a DC voltage; a battery module electrically coupled to the AC-DC converter and configured to receive and store the DC voltage from the AC-DC converter and provide the DC voltage to a battery module output; a DC motor electrically coupled to the battery module output and configured to rotate a propeller shaft when receiving the DC voltage; a propeller operably coupled to the propeller shaft and configured to propel the wave-powered UUV within a body of water when the DC motor drives the propeller shaft; and a guide shaft tube, longitudinally disposed within the body and fixedly attach to the second clearance opening; wherein a second end of the guide shaft may be slidably coupled to guide shaft tube, such that the nose and the body may be in a sliding relationship; wherein a first end of the splined shaft may be attached to the nose buttress plate of the nose and disposed within the first shaft tube, the splined shaft being movable in a reciprocal linear motion having an upward stroke in a first linear direction and a downward stroke in a second linear direction opposite to the first linear direction; and wherein the nose may be adapted to buoy the body to rise and fall with respect to the nose under an influence of the body of water. The splined shaft may include first and second splined shaft helical grooves diametrically opposed to each other; and wherein the LRPC may further comprise: a top clutch operably coupled to the splined shaft and configured to (1) rotate a first direction when the splined shaft performs the upward stroke and (2) rotate a second direction when the splined shaft performs the downward stroke, the top clutch having a top clutch inner race portion and a top clutch helical groove disposed therein; a bottom clutch operably coupled to the splined shaft and configured to (1) rotate the second direction when the splined shaft performs the upward stroke and (2) rotate the first direction when the splined shaft performs the downward stroke, the bottom clutch having a bottom clutch inner race portion and a bottom clutch helical groove disposed therein; top clutch helical roller bearings protruding helically inward into both the top clutch helical groove and the first splined shaft helical groove, such that the top clutch helical roller bearings may be rotatably disposed between the top clutch and the splined shaft; bottom clutch helical roller bearings protruding helically inward into both the bottom clutch helical groove and the second splined shaft helical groove, such that the bottom clutch helical roller bearings may be rotatably disposed between the bottom clutch and the splined shaft; and a flywheel having top and bottom clutch outer race portions on opposing sides, the top clutch outer race portion being operably coupled to the top clutch inner race portion via top clutch sprags and the bottom clutch outer race portion being operably coupled to the bottom clutch inner race portion via bottom clutch sprags, such that the flywheel may be disposed adjacently between the top clutch and the bottom clutch; wherein a first end of the drivetrain may be fixedly attached to the flywheel and a second end may be fixedly coupled to the drive shaft of the AC generator, such that when the flywheel rotates, the drive shaft may rotate. The drivetrain may comprise: a flywheel connector fixedly coupled to the flywheel; and a generator coupler having a first end fixedly coupled to the flywheel connector and a second end fixedly coupled to the drive shaft of the AC generator. The bottom clutch helical groove may be a right-hand helical groove and wherein the top clutch helical groove may be a left-hand helical groove. The wave-powered UUV may further comprise: a splined shaft baffle having a first end portion and a second end portion, the first end portion being sealaby coupled to the nose and disposed within the first shaft tube and the second end portion being scalably coupled to the body, wherein at least a portion of the splined shaft may be disposed within the splined shaft baffle; and a guide shaft baffle having a first end portion and a second end portion, the first end portion being scalably coupled to the nose and disposed within the second shaft tube and the second end portion being sealably coupled to the body, wherein at least a portion of the guide shaft may be disposed within the guide shaft baffle. The wave-powered UUV may further comprise: a journal bearing coupled to the guide shaft tube and slidably engaged with the guide shaft; a first impact spring disposed within a first end portion of the guide shaft tube; and a second impact spring disposed within the second end portion of the guide shaft tube; wherein a second end of the guide shaft may comprise an end stop disposed between the first impact spring and the second impact spring within the guide shaft tube, such that the end stop may be configured to contact the first impact spring when the nose is substantially away from the body and contact the second impact spring when the nose is close or adjacent to the body.

It is an object to provide a UUV capable of recharging by utilizing wave energy. In particular, the UUV is preferably capable of converting reciprocal linear energy associated with wave movement into continuous rotary energy. The continuous rotary energy is preferably converted into AC voltage and then DC voltage.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 2 is an illustration of a cutaway, perspective view of one embodiment of the wave-powered UUV and shows the inner components thereof.

Figure 1:
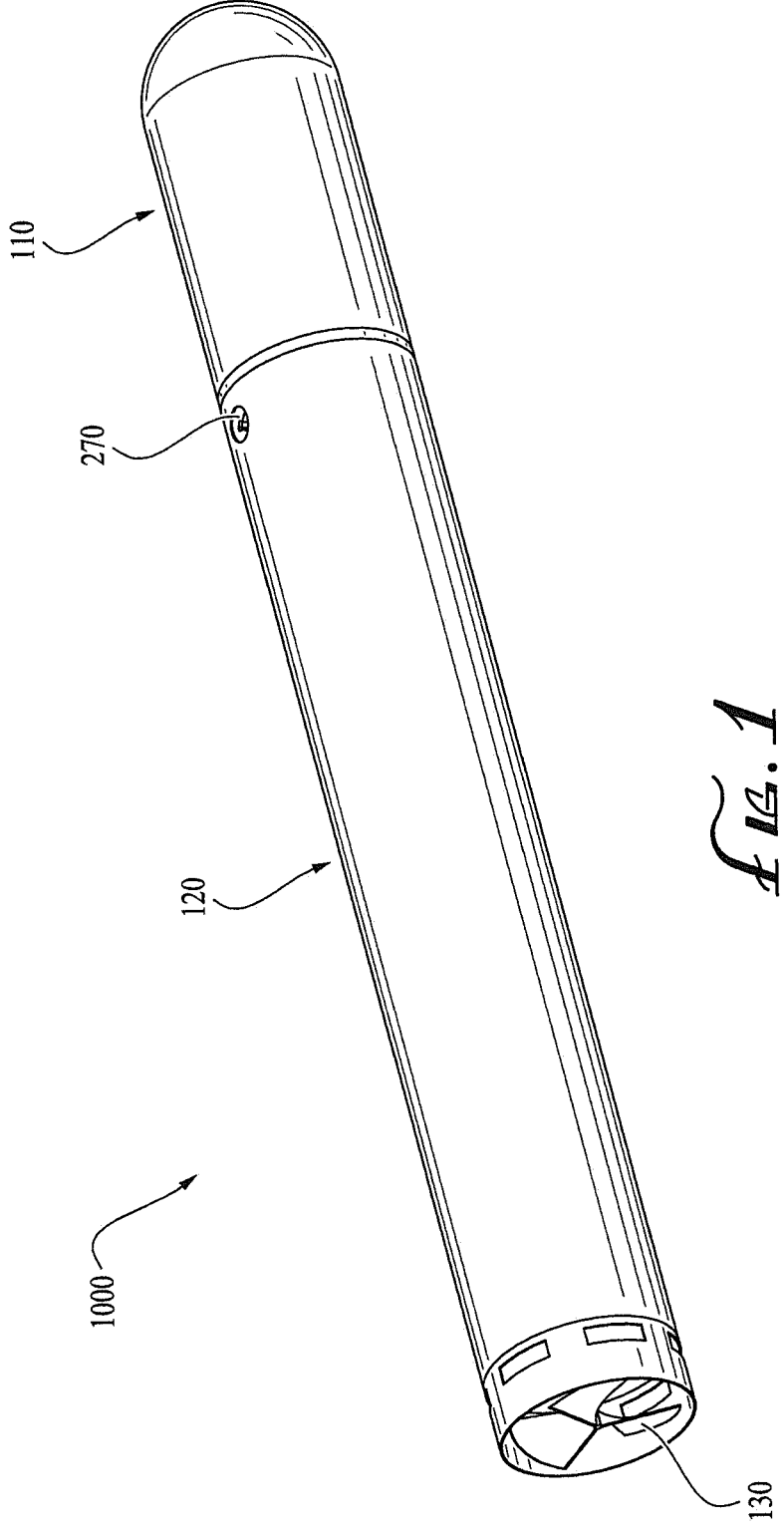
FIG. 1 is an illustration of a perspective view of one embodiment of a wave-powered unmanned undersea vehicle (UUV).

It is to be understood that the foregoing general description and the following detailed description are exemplary and explanatory only and are not to be viewed as being restrictive of the embodiments, as claimed. Further advantages of these embodiments will be apparent after a review of the following detailed description of the disclosed embodiments, which are illustrated schematically in the accompanying drawings and in the appended claims.

DETAILED DESCRIPTION OF ILLUSTRATIVE EMBODIMENTS

In the following detailed description, numerous specific details are set forth in order to provide a thorough understanding of various aspects of one or more embodiments of the wave-powered unmanned undersea vehicle (UUV). However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiments of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . , to provide a thorough understanding of the embodiments. One skilled in the relevant art will recognize, however, that the scope of the disclosed embodiments can be practiced without one or more of the specific details, or with other methods, components, materials, etc. . . . , In other instances, well-known structures, materials, or operations are generally not shown or described in detail to avoid obscuring aspects of the disclosure.

Definitions

In the following description, certain terminology is used to describe certain features of the embodiments of the wave-powered UUV in accordance with the present disclosure. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the terms "unmanned underwater vehicle," "UUV," "autonomous underwater vehicle," and "AUV" may refer to an undersea vehicle, unmanned undersea vehicle, unmanned submersible, an autonomous undersea vehicle, and the like, all of which may function remotely or autonomously for operations below a surface of a body of water.

As used herein, the term "approximately" may refer to a range of values of ±10% of a specific value. For example, the expression "approximately 150 inches" may comprise the values of 150 inches±10%, i.e. the values from 135 inches to 165 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein in this disclosure, the singular forms "a" and "the" may include plural referents, unless the context clearly dictates otherwise. Thus, for example, reference to an "opening" can include reference to one or more of such openings.

The present disclosure relates generally to UUVs, and more particularly, to UUVs having a recharging mechanism utilizing wave energy. In general, UUVs are often used in various applications in maritime environments that are unsuitable, costly, or dangerous to humans. Such applications may include patrolling, surveillance, and oceanic research. UUVs, for instance, may be used to survey a seabed autonomously from a vantage point of a vessel.

Due to battery power constraints, the mission scope of a UUV is generally limited. These limitations affect propulsion duration and operating ranges. As a result, the operating regions of the UUVs are usually restricted to areas proximate to the operator. Because much time and effort may be spent deploying and retrieving a UUV to and from the ocean, it is often desirable for the UUV to have a battery recharging mechanism without having to manually retrieve the UUV from the ocean.

The wave-powered UUV disclosed herein solves these problems by utilizing a recharging mechanism involving wave energy. The wave-powered UUV may utilize a ballast control system in order to position itself in a substantial vertical manner near the surface of the ocean. During this time, the nose of the wave-powered UUV may serve as a buoy for the body near the ocean surface. Importantly, while floating along the ocean surface, the repeating rise and fall of the ocean surface preferably causes the nose to oscillate relative to the body in a linear fashion. In this manner, this oscillating movement may actuate a wave-charging mechanism by converting reciprocating linear energy to continuous rotational energy. The continuous rotational energy may then be converted to AC and DC voltage in order to recharge the battery module of the wave-powered UUV.

In its basic configuration, the wave-powered UUV may comprise a nose and body. The nose may comprise a nose buttress plate and guide shaft. The body may comprise a body buttress plate having first and second clearance openings; linear-to-rotary power converter (LRPC) having a splined shaft attached to the nose buttress plate and longitudinally disposed through the first clearance opening; AC generator operably coupled to the drivetrain of the LRPC; AC-DC converter electrically coupled to the output of the AC generator; battery module electrically coupled to the AC-DC converter; DC motor electrically coupled to the battery module; propeller operably coupled to the DC motor; and guide shaft tube attached to the second clearance opening for receiving the guide shaft. The nose and body may be in a sliding relationship, and the wave-powered UUV may recharge its battery module when subject to wave energy by moving the nose relative to the body in a reciprocal linear motion.

In the accompany drawings, like reference numbers indicate like elements. Reference character 1000 depicts embodiments of the wave-powered UUV.

FIG. 1 is an illustration of a perspective view of one embodiment of a wave-powered UUV 1000. The wave-powered UUV 1000 is preferably configured to operate underwater without a human occupant and may be controlled autonomously or manually by a remote operator in order to perform various tasks such as oceanic research, surveillance, and patrolling. Importantly, embodiments of the wave-powered UUV 1000 may comprise an electrical generator capable of recharging via hydrodynamic interaction. In particular, portions of the nose 110 and body 120 of the wave-powered UUV 1000 may utilize the oscillating wave forces of an ocean surface to recharge the battery module used for propulsion of the wave-powered UUV 1000. In this manner, the range and duration of the wave-powered UUV 1000 traveling underwater may be extended without requiring retrieval from the ocean and recharging its batteries from an external power source. As for example, the wave-powered UUV 1000 may be used to extend its oceanographic survey of a seabed or carry a payload in long distances.

As shown in FIG. 1, one embodiment of the wave-powered UUV 1000 may comprise a nose 110 and body 120, both of which may form the outer structure of the wave-powered UUV 1000. The nose 110 and body 120 may be generally tubular in configuration, as shown, though other shapes may be implemented. For example, some embodiments of the wave-powered UUV 1000 may include a tail assembly having a thruster and/or rudders actuated by servos for navigation. Other embodiments of the wave-powered UUV 1000 may also utilize a circular shroud or fins for stability and maneuverability.

In multiple embodiments, the wave-powered UUV 1000 may comprise a propulsion system for propelling the wave-powered UUV 1000 and navigation system for orienting and navigating the wave-powered UUV 1000. The propulsion system may include a propeller 130 disposed within the aft end of the body 120 for propelling the UUV, whereas the navigation system may comprise an attitude motor 269 (shown in FIG. 5) and attitude propeller 270 for orienting the wave-powered UUV 1000. Although FIG. 1 shows the wave-powered UUV 1000 having a single propeller 130 and single attitude propeller 270, various embodiments of the wave-powered UUV 1000 may comprise multiple propellers and multiple attitude motors and propellers.

Importantly, the wave-powered UUV 1000 may comprise a ballast control system or buoyancy system for adjusting and controlling vehicle buoyancy and orientation during operation. Ballast and buoyancy systems are well-known in the art and are generally used by submarines and autonomous undersea vehicles. In various embodiments, the wave-powered UUV 1000 may comprise pumps, pistons, and multiple chambers within the nose 110 and body 120, and these chambers may be defined by the inner hull 112 and outer hull 113. The chambers may work together with the piston(s) and pump(s), causing the wave-powered UUV 1000 to ascend or descend. Thus, the ballast control system may provide a negative net buoyancy for descending, and positive net buoyancy for ascending. Embodiments of ballast systems or buoyancy systems that may be used by the wave-powered UUV may include, without limitation, the systems disclosed in U.S. Pat. No. 7,921,795, issued to Imlach et al. or U.S. Pat. No. 8,205,570, issued to Tureaud et al., both of which are incorporated herein by reference in its entirety. The attitude motor 269 and attitude propeller 270 may also contribute to the controls of the ballast control system or buoyancy system.

In various embodiments, the wave-powered UUV 1000 may also comprise a navigation system. Navigation systems for UUVs and AUVs are known in the art and generally have at least one processor, which may interface with sensors (not shown) in order to navigate the wave-powered UUV 1000. Various sensors may include, without limitation, camera, sonar, GPS, inertial measurement unit (IMU), compass, pressure sensor, heading sensors, depth sensors, and altitude sensors. For example, one embodiment of the wave-powered UUV 1000 may comprise a navigation system having: a GPS, heading sensor, depth and altitude sensors, and an acoustic navigation system, such as the system disclosed in U.S. Pat. No. 10,908,250, issued to Dudinsky et al., which is incorporated herein by reference in its entirety. In this embodiment, the wave-powered UUV 1000 may be deployed near a desired location and may utilize an acoustic transponder (beacon). Using the acoustic navigation system with the GPS reference, the wave-powered UUV 1000 may perform a survey to determine the horizontal location of the beacon on the seafloor and calculate a relative position between the beacon and the target. The wave-powered UUV 1000 can thus create a travel path via waypoints, thereby allowing wave-powered UUV 1000 to relocate the target, using the beacon as a navigation aid.

FIG. 2 is an illustration of a cutaway, perspective view of one embodiment of the wave-powered UUV 1000 and shows the inner components of the wave-powered UUV 1000. As shown in FIG. 2, an embodiment of the wave-powered UUV 1000 may comprise: a nose 110, body 120, linear-to-rotary power converter (LRPC) 500, propeller 130, AC generator 190, AC-DC converter 200, battery module 210, DC motor 220, guide shaft 230, journal bearing 240, splined shaft baffle 250, guide shaft baffle 260, and attitude propeller 270.

As mentioned above, the nose 110 and body 120 may form the outer structure of the wave-powered UUV 1000 and may be generally tubular, as shown. The LRPC 500 may be device or mechanism configured to convert reciprocating linear energy into continuous rotational energy and may comprise: a splined shaft 140, top clutch 150, bottom clutch 160, flywheel 170, and generator coupler 180, all of which are described in more detail in the additional figures below. The AC generator 190 and AC-DC converter 200 may be components used to convert the rotational energy to an electrical charge. The battery module 210 may comprise one or more rechargeable and dischargeable battery cells configured to store electrical energy and serve as a power source for the wave-powered UUV 1000. The DC motor 220 may be configured to convert the electrical energy stored in the battery module 210 into mechanical energy. The propeller 135, which may be axially disposed within the aft end of the body 120, may be adapted to convert the mechanical energy into a propulsion force in order to propel the wave-powered UUV 1000. The guide shaft 230 and journal bearing 240 may together be used to provide support and stability to both the nose 110 and body 120 during the battery recharging operation. The splined shaft baffle 250 and guide shaft baffle 260 may be used to protect the splined shaft 140 and guide shaft 230 from the oceanic elements. The attitude motor 269 (shown in FIG. 5) and attitude propeller 270 may be configured to orient and navigate the wave-powered UUV 1000. Details about the above components are described below.

Figure 3:
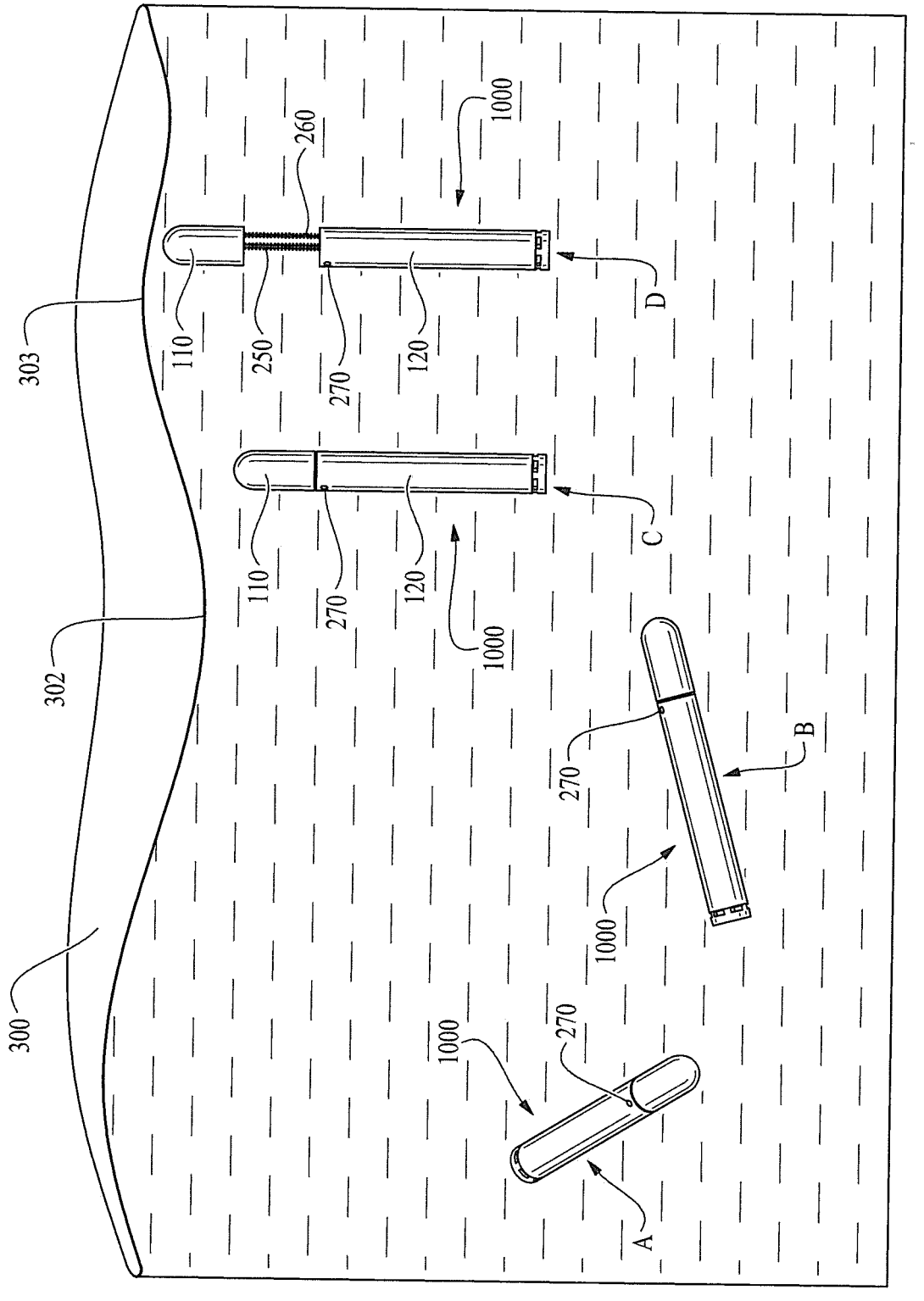
FIG. 3 is an illustration of one embodiment of the wave-powered UUV and shows the battery charging operation.

FIG. 3 is an illustration of one embodiment of the wave-powered UUV and shows the battery charging operation. As shown in FIG. 3, the battery charging operation may involve the wave-powered UUV 1000 interacting with the oscillating behavior of the ocean surface 300 (i.e., when the ocean surface 300 periodically rises as a wave crest 303 and falls as a wave trough 302), as shown in positions A, B, C, D. Specifically, during patrol mode beneath the ocean surface 300 (i.e., positions A and B), the wave-powered UUV 1000, through the assistance of the attitude motor 269 and attitude propeller 270 (and the ballast control system, as described above) may travel from a downwards movement/ orientation with the attitude directed towards the ocean seafloor (position A) into an upwards movement/orientation with the attitude shifting towards the ocean surface 300 (position B). From position B, the wave-powered UUV 1000 may then proceed into battery charging mode (i.e., positions C and D) by positioning itself near the ocean surface 300 in a substantial vertical manner. This may be accomplished with the assistance of the attitude motor 269 and attitude propeller 270 and possibly a ballast control system, described above.

Specifically, while the wave-powered UUV 1000 is in position C, the wave-powered UUV 1000 may be subject to the repeating rise and fall of the ocean surface 300 either as a wave crest 303 or wave trough 302, respectively. As a result, the nose 110, which may buoy the body 120 within the body of water, may oscillate along the ocean surface 300 relative to the body 120. As a result, the nose 110 may perform a reciprocal linear motion having an upward stroke in a first linear direction and a downward stroke in a second linear direction opposite to the first linear direction. In particular, when the ocean surface 300 drops as a wave trough 302, the nose 110 may be close or adjacent to the body 120, as shown in position C. On the other hand, when the ocean surface 300 rises as a wave crest 303, the nose 110 may lift away from the body 120, as shown in position D. Given that the nose 110 and body 120 are operably coupled to each other via the splined shaft 140 and guide shaft 230, the repeating rise and fall of the ocean surface 300 (as a wave crest 303 and wave trough 302) may cause the wave-powered UUV 1000 to repeatedly change between positions C and D. Thus, as the wave-powered UUV 1000 periodically shifts between positions C and D, wave power may then be generated by the ocean surface 300 using the time varying pressure force exerted onto the nose 110 and body 120 of the wave-powered UUV 1000.

Notably, FIG. 3 also shows how the nose 110 may interact with the body 120 using the splined shaft 140 and guide shaft 230. The splined shaft 140 and guide shaft 230 may be fixedly attached to the nose 110. The body 120, on the other hand, may be slidably and operably coupled to the splined shaft 140 and guide shaft 230. Thus, as the nose 110 moves towards and away from the body 120 due to the oscillating behavior of the ocean surface 300, the body 120 may slide along the splined shaft 140 and guide shaft 230 in a repetitive fashion. This reciprocal, oscillating movement, shown in positions C and D, may actuate the LRPC 500, which is preferably the wave-charging mechanism that recharges the battery module 210 of the wave-powered UUV 1000. Further, the splined shaft baffle 250 and guide shaft baffle 260 may seal the splined shaft 140 and guide shaft 230, respectively, in order to protect the splined shaft 140 and guide shaft 230 from the oceanic elements. After the battery module 210 is charged, the attitude motor 269 and attitude propeller 270 may then reorient the wave powered UUV 1000 back into patrol mode. Additional details of the wave-charging mechanism is described further below.

Various embodiments of the wave powered UUV 1000 may be configured with a ballast control system. For example, embodiments may include: extension and removal of fins from the body to control heading; pumping of water into and out of compartments between the inner and outer hull to adjust buoyancy and control depth, pumping water between forward and aft compartments to adjust attitude, and use of sonar to measure distance to the bottom or to the surface. The wave-powered UUV navigates to a vertical position below the ocean surface to access wave energy that will be stored in the battery module by pumping water from forward to aft compartments to change attitude and pumping water to and from aft compartments to control depth in order to vertically orient itself into positions C and D.

Figure 4:
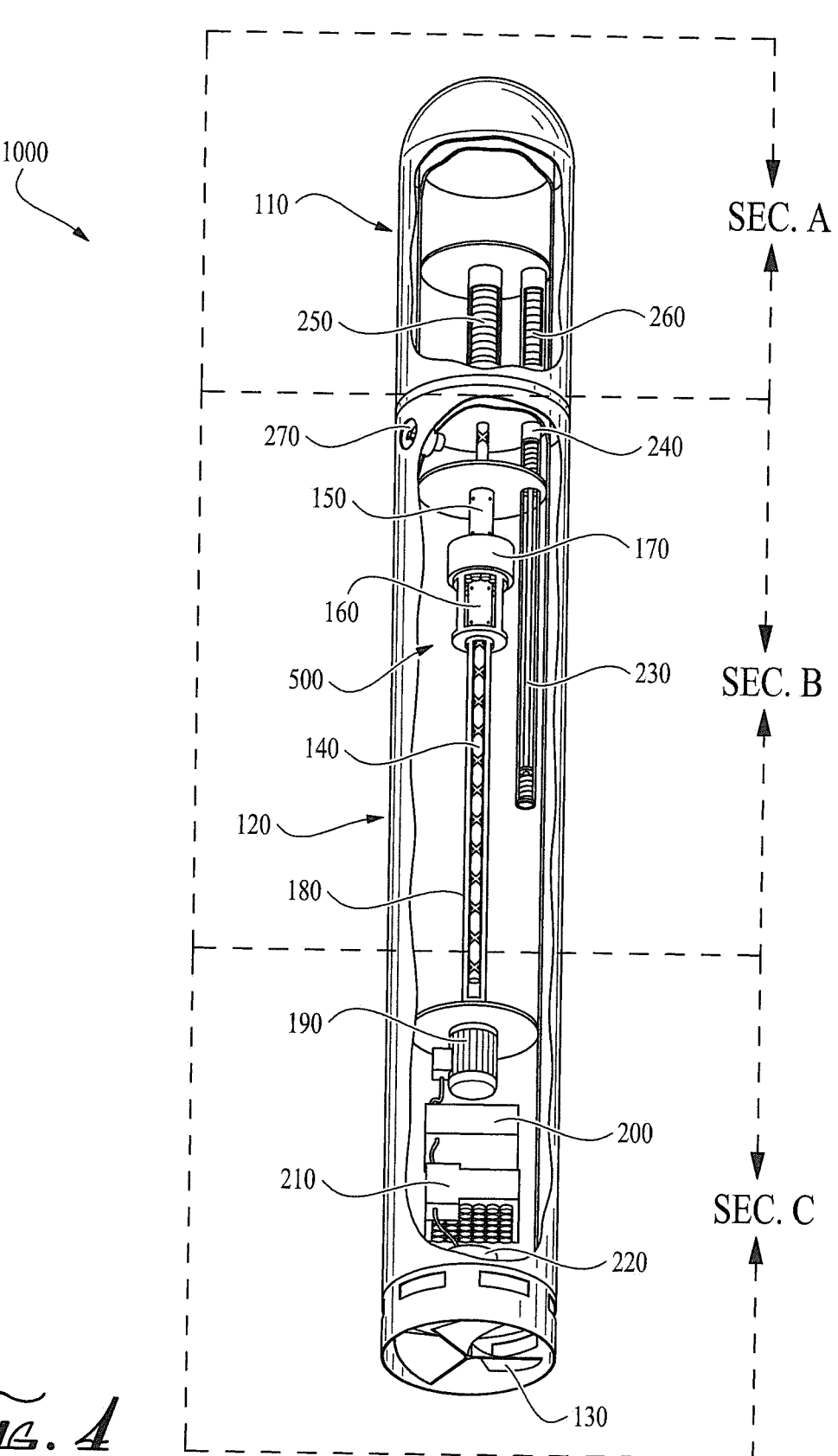
FIG. 4 is an illustration of another cutaway, perspective view of one embodiment of the wave-powered UUV and shows the inner components thereof.

FIG. 4 is an illustration of another cutaway, perspective view of one embodiment of the wave-powered UUV 1000 and shows the inner components thereof 1000. As shown in FIG. 4, one embodiment of the wave-powered UUV 1000 may comprise: a nose 110 (shown in section A), fore end portion of the body 120 (shown in section B), aft end portion of the body 120 (shown in section C), splined shaft 140, and guide shaft 230. The nose 110 may comprise a splined shaft baffle 250 and guide shaft baffle 260. The fore end portion of the body 120 may comprise: an LRPC 500, attitude propeller 270, and journal bearing 240, wherein the LRPC 500 may comprise: a splined shaft 140, top clutch 150, bottom clutch 160, flywheel 170, and generator coupler 180. The aft end portion of the body 120 may comprise: an AC-DC converter 200, battery module 210, DC motor 220, and propeller 130.

To help clarify the battery recharging operation of the wave-powered UUV 1000, the following figures (i.e., FIGS. 4 to 12) shows images of the wave-powered UUV 1000 in a vertically oriented manner—that is, as the wave-powered UUV 1000 would interact with the ocean surface 300 in positions C and D. Further, FIG. 4 divides the wave-powered UUV 1000 into sections A, B, and C. These sections will be described in more detailed below in FIGS. 5 to 11 and 14, with FIGS. 12A and 12B providing a cross-section view of the LRPC.

Figure 5:
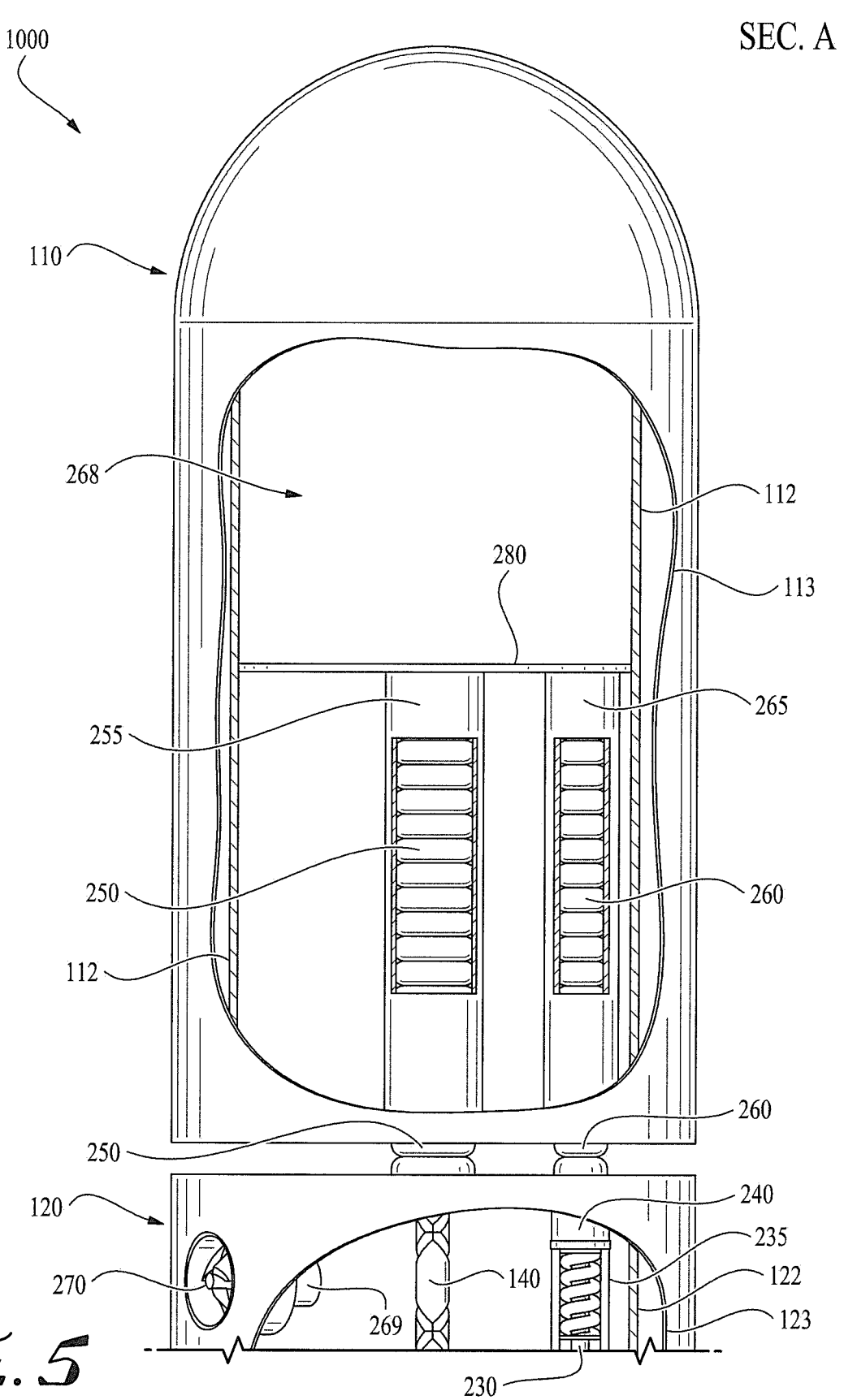
FIG. 5 is an illustration of a cutaway, perspective view of one embodiment of the nose and fore end portion of the body and shows the inner components thereof in greater detail.

FIG. 5 is an illustration of a cutaway, perspective view of one embodiment of the nose 110 and fore end portion of the body 120 and shows the inner components thereof in greater detail. As shown in FIG. 5, one embodiment of the wave-powered UUV 1000 may comprise: a nose 110, body 120, splined shaft 140, and guide shaft 230, wherein the nose 110 may comprise: splined shaft baffle 250, guide shaft baffle 260, nose buttress plate 280, first shaft tube 255, second shaft tube 265, and electronics compartment 268. The body 120 may comprise: a journal bearing 240 and attitude propeller 270.

Notably, FIG. 5 shows that the nose buttress plate 280, which may be substantially disk-shaped, may be fixedly attached to the inner hull 112 of the nose 110 and may define an electronics compartment 268 within the nose 110. The orientation of the nose buttress plate 280 is also preferably substantially flat when the nose 110 is disposed in an upright position, as shown in FIG. 5. In this manner, when attached to the nose buttress plate 280, the splined shaft 140 and guide shaft 230 may traverse longitudinally between the nose 110 and body 120.

FIG. 5 also depicts the first shaft tube 255 and second shaft tube 265 longitudinally disposed within the nose 110. The first shaft tube 255 and second shaft tube 265, which are preferably cylindrical in shape, may comprise first ends fixedly attached to one side of the nose buttress plate 280. The second open ends of the first shaft tube 255 and second shaft tube 265 may be positioned near the aft end of the nose 110, such that the first shaft tube 255 and second shaft tube 265 may traverse from the nose buttress plate 280 to the aft end of the nose 110.

Various embodiments of the nose 110 may include an end plate at the aft end of the nose 110. In an exemplary embodiment, the nose may lack an end plate, and thus, may have at the open aft end. In these embodiments, clearance holes may be included to expose the second open ends of first shaft tube 255 and second shaft tube 265 to permit access towards the interior cylindrical spaces of the first shaft tube 255 and second shaft tube 265.

Importantly, the first shaft tube 255 and second shaft tube 265 may encircle the splined shaft 140 and guide shaft 230, respectively, such that the splined shaft 140 and guide shaft 230 are preferably concentrically disposed within the first shaft tube 255 and second shaft tube 265. The splined shaft 140 and guide shaft 230 may also have first ends that preferably terminate and fixedly attached to the nose buttress plate 280. In an exemplary embodiment, the splined shaft 140 and guide shaft 230 preferably traverse and extend longitudinally from the nose 110 into the inner hull 122 of the body 120, such that the second ends of the splined shaft 140 and guide shaft 230 may be disposed within the body 120.

In an exemplary embodiment, the splined shaft baffle 250 and guide shaft baffle 260 may substantially cover the first end portions of the splined shaft 140 and guide shaft 230, respectively, in order to the protect the splined shaft 140 and guide shaft 230 from the ocean elements. Specifically, the splined shaft baffle 250 may be disposed within the first shaft tube 255 and may have a first end sealaby attached to the nose buttress plate 280. A second end of the splined shaft baffle 250 may be sealably attached to the fore end of the body 120, as shown in FIG. 5. Similarly, the guide shaft baffle 260 may be disposed within the second shaft tube 265 and may have a first end sealably attached to the nose buttress plate 280. A second end of the guide shaft baffle 260 may likewise be scalably attached to the fore end of the body 120, as shown in FIG. 5. In this manner, as the nose 110 moves away from the body 120 from position C to position D in FIG. 3 (such that the splined shaft 140 and guide shaft 230 are moving in concert), the splined shaft baffle 250 and guide shaft baffle 260 may protect the splined shaft 140 and guide shaft 230 from water damage.

Finally, FIG. 5 shows that the nose 110 may comprise an inner hull 112 and outer hull 113, whereas the body 120 may likewise comprise an inner hull 122 and outer hull 123. As discussed above, the inner hull 112 and outer hull 113 may together define one or more chambers used for the ballast control system.

Figure 6:
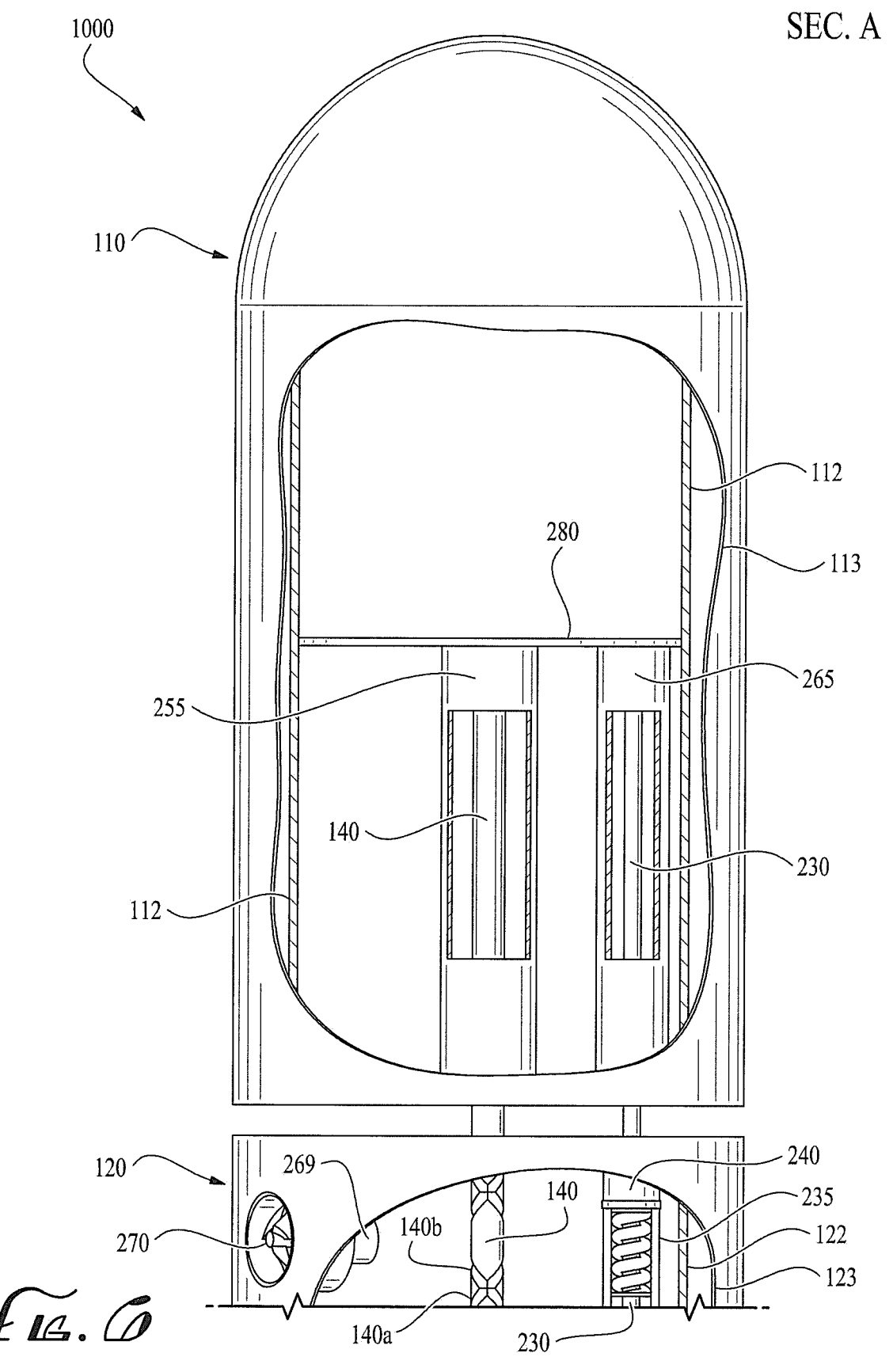
FIG. 6 is an illustration of a cutaway, perspective view of one embodiment of the nose and fore end portion of the body and shows the inner components thereof without the splined shaft baffle and guide shaft baffle.

FIG. 6 is an illustration of a cutaway, perspective view of one embodiment of the nose 110 and fore end portion of the body 120 and shows the inner components thereof without the splined shaft baffle 250 and guide shaft baffle 260. As shown in FIG. 6, one embodiment of the wave-powered UUV 1000 may comprise: a nose 110, body 120, splined shaft 140, and guide shaft 230, wherein the nose 110 may comprise: a nose buttress plate 280, first shaft tube 255, and second shaft tube 265. The body 120 may comprise: a journal bearing 240 and attitude propeller 270. For clarification purposes, the spline shaft baffle 250 and guide shaft baffle 260 are removed in FIG. 6 to show that the first ends of the splined shaft 140 and guide shaft 230 terminate at the nose buttress plate 280 and longitudinally traverse from the nose buttress plate 280 to the body 120.

Figure 11:
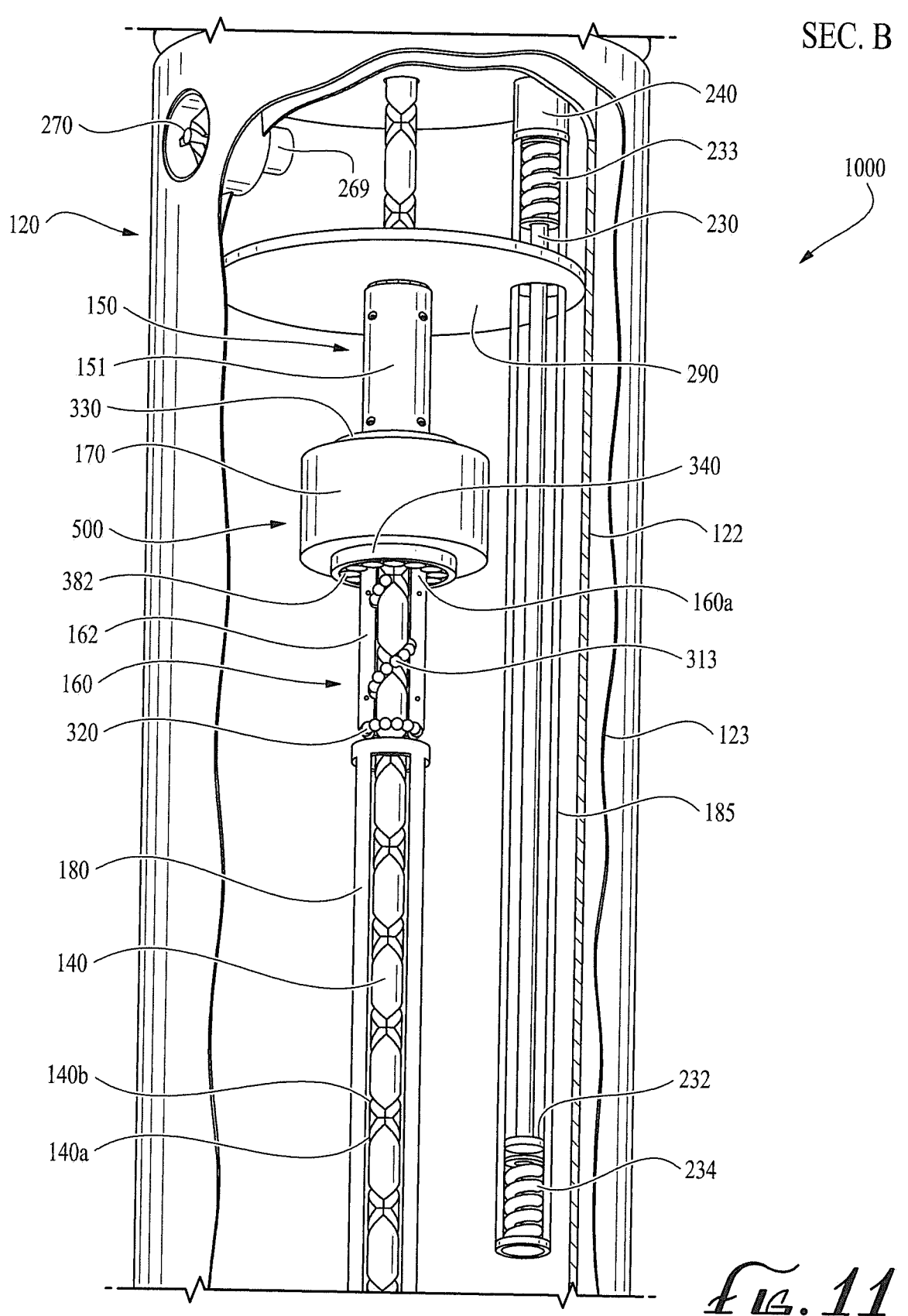
FIG. 11 is an illustration of a cutaway, bottom perspective view of a portion of one embodiment of the body and shows some of the inner components thereof without the front portion of the bottom clutch.

Importantly, FIG. 6 shows the splined shaft 140 having at least two splined shaft helical grooves 140*a*, 140*b*—i.e., a right-hand helical groove 140*a* and left-hand helical groove 140*b*, both adapted to radially receive top clutch helical roller bearings 312 (shown in FIG. 9) and bottom clutch helical roller bearings 313 (shown in FIG. 11). In an exemplary embodiment, the two helical grooves 140*a*, 140*b* may be diametrically opposed to each other. The top clutch 150 may have a first set of helical roller bearings 312 that protrude helically inward into the associated helical groove 140*a*, 140*b*. The boundary walls of each helical groove 140*a*, 140*b* thus may engage the associated top clutch helical roller bearings 312 and bottom clutch helical roller bearings 313 and rotate either the top clutch 150 or bottom clutch 160 when the splined shaft 140 moves vertically. Additional details on the functionality of the two splined shaft helical grooves 140*a*, 140*b* in relation to the top clutch 150, bottom clutch 160, top clutch helical roller bearings 312, and bottom clutch helical roller bearings 313 are discussed further below.

Figure 7:
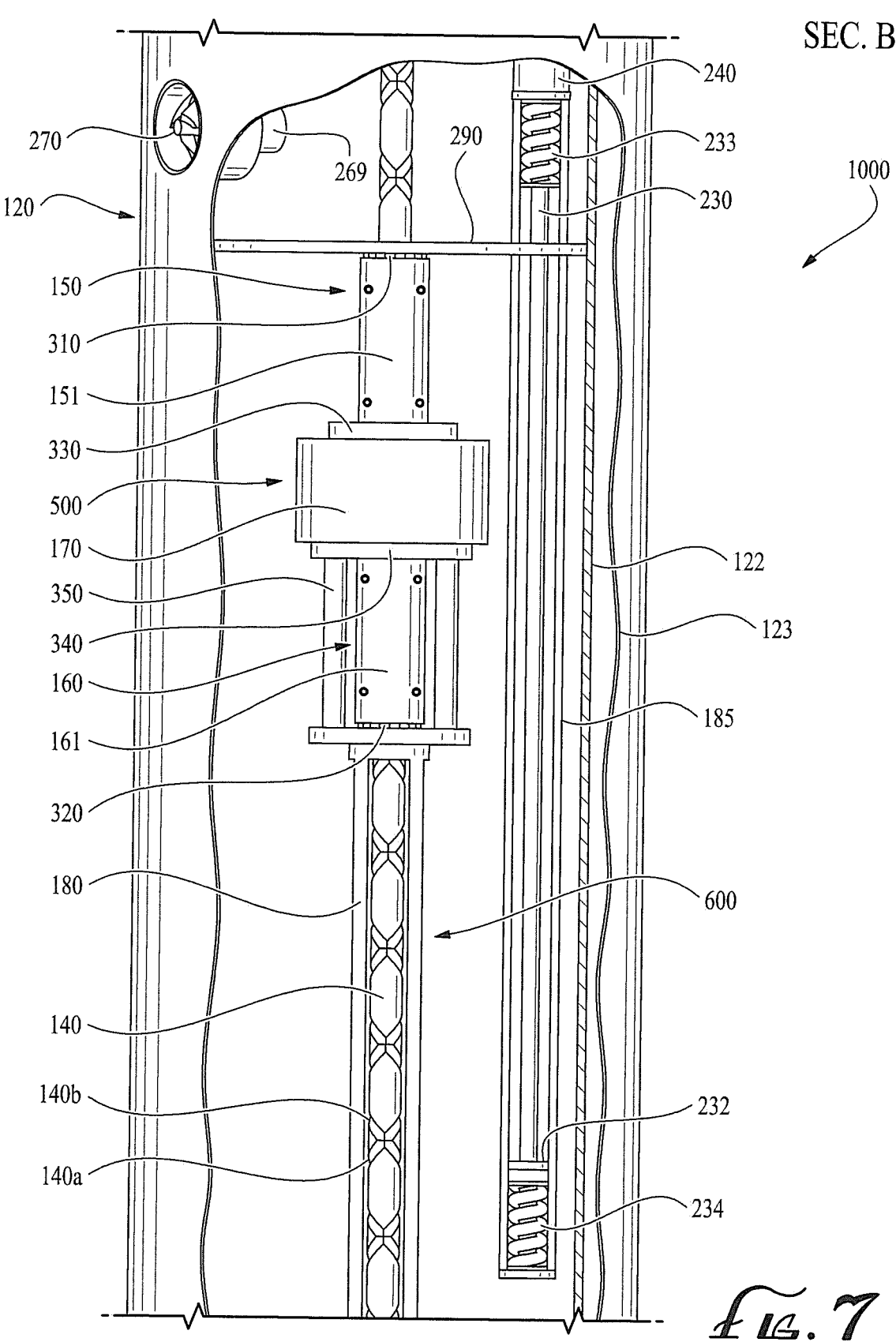
FIG. 7 is an illustration of a cutaway, side elevation view of a portion of one embodiment of the body and shows some of the inner components thereof in greater detail.

FIG. 7 is an illustration of a cutaway, side elevation view of a portion of one embodiment of the body 120 and shows some of the inner components of the body 120 in greater detail. As shown in FIG. 7, one embodiment of the body 120 may comprise: a guide shaft 230, journal bearing 240, attitude motor 269, attitude propeller 270, body buttress plate 290, and LRPC 500. The body buttress plate 290, which is preferably disk-shaped, may have at least two clearance openings 290*a*, 290*b* (shown in FIGS. 9 and 10) and may be fixedly attached to the inner hull 122 of the body 120. Like the nose buttress plate 280, the orientation of the body buttress plate 290 may be substantially flat when the body 120 is oriented in an upright position, as shown in FIG. 7.

Importantly, FIG. 7 depicts the LRPC 500, which is preferably configured to convert reciprocating linear energy into continuous rotational energy. As shown in FIG. 7, an embodiment of the LRPC 500 may comprise: a splined shaft 140, top clutch 150, bottom clutch 160, flywheel 170, and drivetrain 600 having a flywheel connector 350 and generator coupler 180. The splined shaft 140 may be longitudinally disposed through a clearance opening 290*a* of the body buttress plate 290, and the flywheel 170 may be configured to rotate the drivetrain 600 when the splined shaft 140 moves in a reciprocal, linear motion. Thus, the LRPC 500 may be configured to convert reciprocating linear energy from the splined shaft 140 into continuous rotational energy via the drivetrain 600.

Importantly, FIG. 7 shows that the top clutch 150 may be operably coupled to the splined shaft 140 and is preferably configured to (1) rotate a first direction when the splined shaft 140 performs an upward stroke and (2) rotate a second direction when the splined shaft 140 performs a downward stroke. The top clutch 150 may also comprise a front portion 151 and rear portion 152 (shown in FIG. 8), both of which may have a top clutch helical groove therein and a top clutch inner race portion 150*a* (shown in FIG. 9) when combined. Similarly, the bottom clutch 160 may be operably coupled to the splined shaft 140 and rotate when the splined shaft 140 performs an upward or downward stroke. Unlike the top clutch 150, however, the bottom clutch 160 is preferably configured to (1) rotate towards the second direction when the splined shaft 140 performs an upward stroke and (2) rotate the first direction when the splined shaft 140 performs a downward stroke. The bottom clutch 160 may also comprise a front portion 161 and rear portion 162 (shown in FIGS. 8 and 11), both of which may have a bottom clutch helical groove therein and a bottom clutch inner race portion 160*a* (shown in FIG. 11) when combined.

The flywheel 170 is preferably configured to conserve angular momentum to store rotational energy and may have a hole for clearance of the splined shaft 140. Importantly, the flywheel 170 is preferably disposed adjacently between the top clutch 150 and bottom clutch 160 via outer and inner race portions. Specifically, on one side of the flywheel 170, the flywheel 170 may comprise a top clutch outer race portion 330 that is operably coupled to the top clutch inner race portion 150*a* via top clutch sprags 380 (shown in FIG.

9). On the opposing side, the flywheel 140 may comprise a bottom clutch outer race portion 340 that is operably coupled to the bottom clutch inner race portion 160*a* via bottom clutch sprags 382 (shown in FIG. 11). In this manner, when either the top clutch 150 or bottom clutch 160 rotates at a certain direction, torque may be applied to the flywheel 170.

In order for the top clutch 150 and bottom clutch 160 to engage and rotate upon linear movement of the splined shaft 140 (i.e., rotate during the upward or downward stroke of the splined shaft 140), roller bearings may be radially engaged (through which the splined shaft 140 has clearance) and helically engaged (by which the splined shaft 140 is coupled to the top clutch 150 and bottom clutch 160) between components of the LRPC 500—i.e., body buttress plate 290, top clutch 150, bottom clutch 160, flywheel 170 and drivetrain 600 (or flywheel connector 350). Thus, bearings utilized by the LRPC 500 may comprise: top clutch roller bearings 310; top clutch helical roller bearings 312 (shown in FIG. 8 and FIG. 13); flywheel top roller bearings 390 (shown in FIG. 10 and FIG. 13); bottom clutch roller bearings 320; bottom clutch helical roller bearings 313 (shown in FIG. 8 and FIG. 13); and flywheel bottom roller bearings 392 (shown in FIG. 12B).

Specifically, the top clutch roller bearings 310 may be radially disposed within a circular groove of the body buttress plate 290 and is preferably rotatably disposed between the body buttress plate 290 and top clutch 150. Additionally, the top clutch helical roller bearings 312 may protrude helically inwardly into a top clutch helical groove (preferably located within the top clutch 150) and the first splined shaft helical groove—i.e., either the right-hand helical groove 140*a* or left-hand helical groove 140*b*. In this manner, the top clutch spiral bearings 312 may be rotatably disposed between the top clutch 150 and the splined shaft 140. Finally, flywheel top roller bearings 390 may be rotatably engaged between the top clutch 150 and flywheel 170 (i.e., between the top clutch inner race portion 150*a* of the top clutch 150 and top clutch outer race portion 330 of the flywheel 170).

Similarly, the bottom clutch roller bearings 320 may be radially disposed within a circular groove of the drivetrain 600 (or flywheel connector 350) and may be rotatably disposed between the drivetrain 600 and bottom clutch 160. Additionally, the bottom clutch helical roller bearings 313 may protrude helically inwardly into the bottom clutch helical groove (preferably located within the bottom clutch 160) and the second splined shaft helical groove (as opposed to the first splined shaft helical groove). Thus, the second splined shaft helical groove can either be (1) a right-hand helical groove 140*a* if the first splined shaft helical groove is a left-hand helical groove 140*b*; or (2) a left-hand helical groove 140*b* if the first splined shaft helical groove is a right-hand helical groove 140*a*. In this manner, the bottom clutch helical roller bearings 313 may be rotatably disposed between the bottom clutch 160 and the splined shaft 140. Finally, the flywheel bottom roller bearings 392 may be rotatably engaged between the bottom clutch 160 and flywheel 170 (i.e., between the bottom clutch inner race portion 160*a* of the bottom clutch 160 and bottom clutch outer race portion 340 of the flywheel 170).

Figure 13:
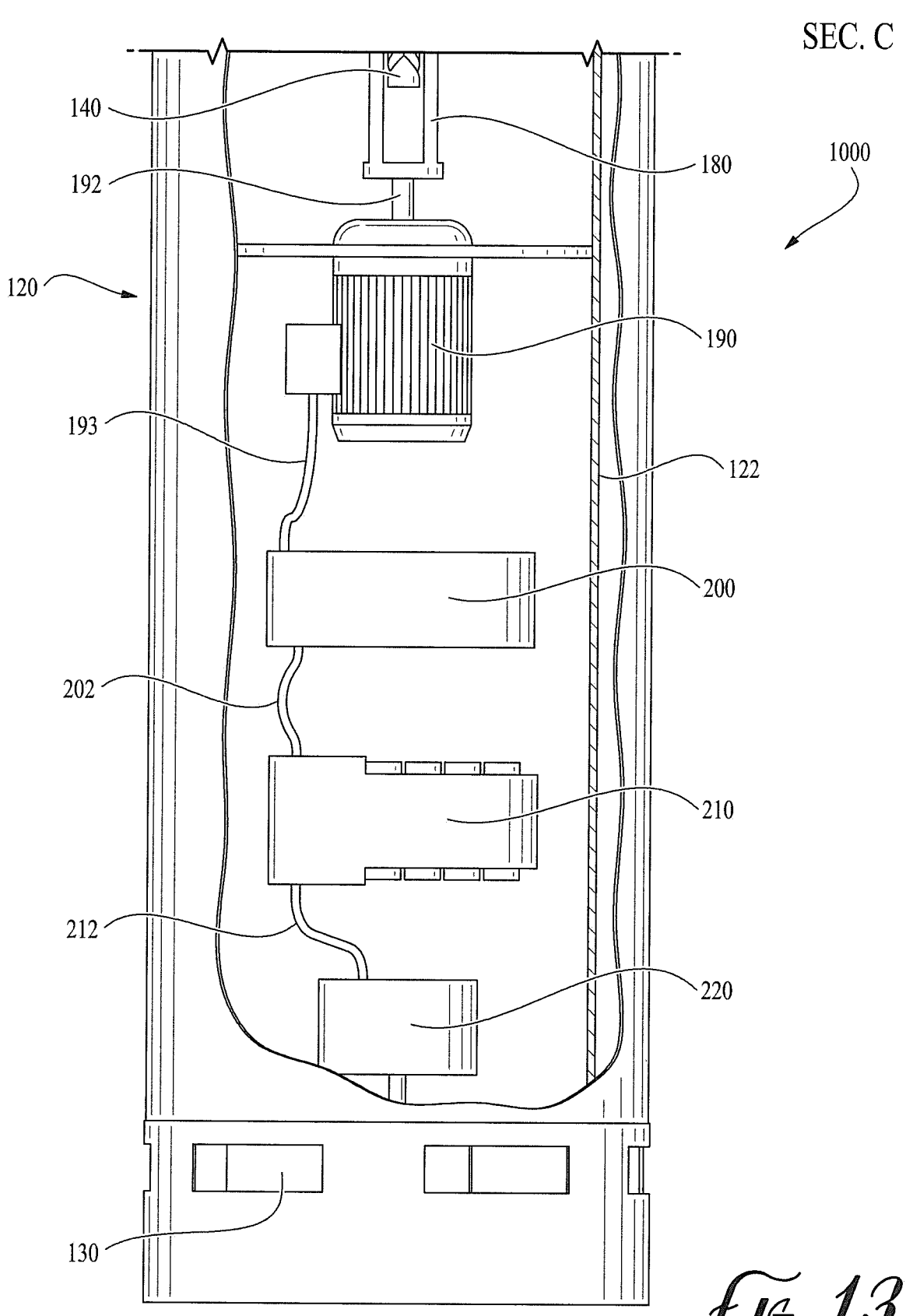
FIG. 13 is an illustration of a cutaway view of one embodiment of the aft end portion of the body and shows additional inner components thereof in greater detail.

FIG. 7 also depicts a drivetrain 600 used to deliver rotational energy from the flywheel 170 to the drive shaft 192 of the AC generator 190 (shown in FIG. 13). Specifically, a first end of the drivetrain 600 may be fixedly attached to the flywheel 170, whereas the second end of the drivetrain 600 may be fixedly coupled to a drive shaft 192 of an AC generator 190. In this manner, when the flywheel 170 rotates, the drive shaft 192 of the AC generator 190 may rotate as well. As shown in FIG. 7, an embodiment of the drivetrain 600 may comprise: a flywheel connector 350 and generator coupler 180. The flywheel connector 350 may be fixedly coupled to the flywheel 170, and the generator coupler 180 may have a first end fixedly coupled to the flywheel connector 350 and a second end fixedly coupled to the drive shaft 192 of the AC generator 190 (shown in FIG. 13).

Regarding the guide shaft 230, the guide shaft 230 may provide vertical support during the battery recharging operation when the wave-powered UUV 1000 transitions between positions C and D of FIG. 3. The guide shaft 230 may also help stabilize the reciprocal linear motion of the nose 110 relative to the body 120 during the upward stroke in a first linear direction and a downward stroke in a second linear direction opposite to the first linear direction. This may be accomplished through the interaction of the guide shaft 230 and associated components—i.e., guide shaft tube 185, guide shaft end stop 232, top impact spring 233, bottom impact spring 234, and journal bearing 240.

Specifically, as shown in FIG. 7, the guide shaft tube 185 may traverse longitudinally through a second clearance opening 290*b* of the buttress plate 290. In one embodiment, the guide shaft tube 185 may be a cylindrical cage, as shown in FIG. 7, or in other embodiments, a long tube or cylinder. The top impact spring 233 is preferably disposed within and near the fore end portion of guide shaft tube 185, whereas the bottom impact spring 234 may be disposed within the aft end portion of the guide shaft tube 185. The journal bearing 240 is preferably configured to support the guide shaft 230 and may be located near the fore end portion of the guide shaft tube 185 adjacent to the top impact spring 233, as shown in FIG. 7. The guide shaft 230 is preferably configured to move through the journal bearing 240, which may only permit relative linear motion between the nose 110 and body 120. In this manner, the range of motion or separation between the nose 110 and body 120 as the wave-powered UUV 1000 cycles back and forth between position C and position D may also correspond with the range of motion of the guide shaft end stop 232 within the guide shaft tube 185.

In particular, when the nose 110 and body 120 are in close proximity to each other or together as shown in position C, the guide shaft end stop 232 is preferably farthest away from the top impact spring 233 and in close proximity or adjacent to the bottom impact spring 234. On the other hand, when the nose 110 and body 120 are farthest away from each other as shown in position D, the guide shaft end stop 232 is preferably located in close proximity or adjacent to the top impact spring 233 and farthest away from the bottom impact spring 234 (preferably as the same distance between the nose 110 and body 120). This distance or range of motion preferably correlates with the range of motion or stroke of the splined shaft 140 movement through the LRPC 500, and more particularly, through the top clutch 150, bottom clutch 160, and generator couple 180. Additionally, this movement is preferably subject to only relative vertical/linear motion between the nose 110 and body 120 as the wave-powered UUV 1000 cycles back and forth between position C and position D. Furthermore, this range of motion or movement preferably does not permit or stops rotational movement of the nose 110 relative to the body 120 as a reaction to the forces causing rotation of the drivetrain 600. As a result, an optimal amount of power may be created from the wave energy generated from the ocean surface 300 by converting kinetic energy stored in the flywheel 170 into electricity by the AC generator 190 in order to charge the battery module 210.

Importantly, as the wave-powered UUV 1000 cycles back and forth between position C and position D in FIG. 3, the splined shaft 140 preferably moves relative to the top clutch 150 (i.e., front portion 151 and rear portion 152 of the top clutch 150) and bottom clutch 160 (front portion 161 and rear portion 162 of the bottom clutch 160). This movement of the splined shaft 140 preferably causes the top clutch outer race portion 330 of the flywheel 170, bottom clutch outer race portion 340, flywheel connector 350, generator coupler 180, and drive shaft 192 of the AC generator 190 (i.e., drivetrain) to rotate in unison. In an exemplary embodiment, this rotation preferably occurs in a single rotational direction, such that kinetic energy stored in the flywheel 170 or converted into electricity by the AC generator 190 need not decrease to zero while recharging the battery module 210. Finally, FIG. 7 shows the splined shaft 140 having at least two helical grooves 140*a*, 140*b*—i.e., a right-hand helical groove 140*a* and left-hand helical groove 140*b*-both of which preferably intersect each another in a substantial diamond pattern.

Figure 8:
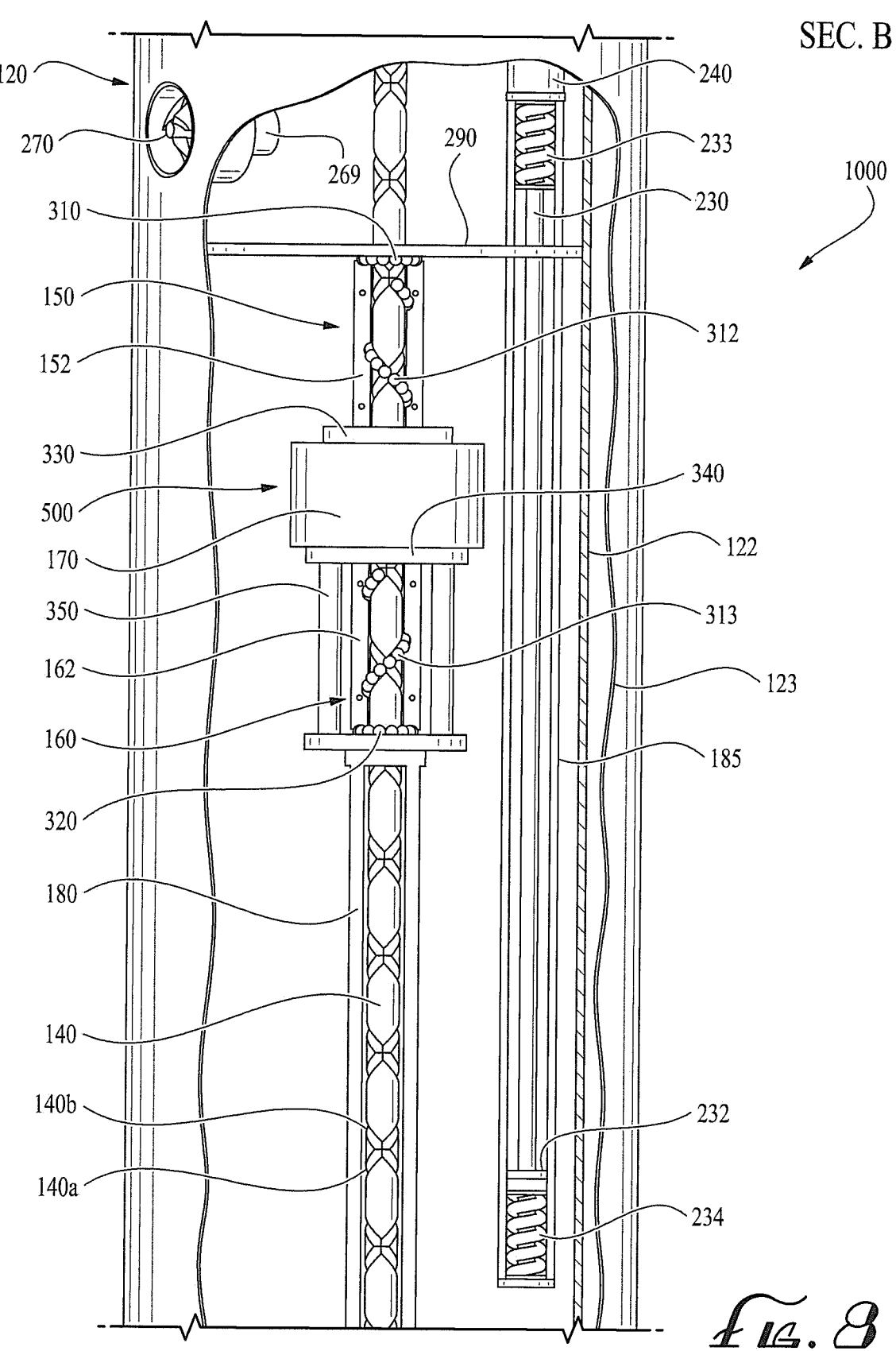
FIG. 8 is an illustration of a cutaway, side elevation view of a portion of one embodiment of the body and shows some of the inner components thereof without the front portions of the top clutch and bottom clutch.

FIG. 8 is an illustration of a cutaway, side elevation view of a portion of one embodiment of the body 120 and shows some of the inner components of the body 120 without the front portions 151, 161 of the top clutch 150 and bottom clutch 160. Here, when removing the front portion 151 of the top clutch 150 and the front portion 161 of the bottom clutch 160, FIG. 8 depicts the top clutch roller bearings 310, top clutch helical roller bearings 312, bottom clutch roller bearings 320, and bottom clutch helical roller bearings 313. As shown in FIG. 8, top clutch helical roller bearings 312 may be rotatably disposed within a top clutch helical groove, which is preferably located within the top clutch 150 and in-between the front portion 151 and rear portion 152 of the top clutch 150. Notably, the top clutch helical roller bearings 312 may also be rotatably disposed within a first splined shaft helical groove of the splined shaft 140, which can either be the right-hand helical groove 140*a* or left-hand helical groove 140*b*.

Similarly, bottom clutch helical roller bearings 313 may be rotatably disposed within a bottom clutch helical groove, which is preferably located within the bottom clutch 160 and in-between the front portion 161 and rear portion 162 of the bottom clutch 160. Notably, the bottom clutch helical roller bearings 313 may also be rotatably disposed within the second splined shaft helical groove (as opposed to the first splined shaft helical groove). For example, the second splined shaft helical groove can either be (1) a right-hand helical groove 140*a* if the first splined shaft helical groove is a left-hand helical groove 140*b*; or (2) a left-hand helical groove 140*b* if the first splined shaft helical groove is a right-hand helical groove 140*a*. Therefore, although FIG. 8 shows the top clutch helical roller bearing 312 located on the left-hand helical groove 140*b* and the bottom clutch helical roller bearing 313 located on the right-hand helical groove 140*a*, other embodiments may have the top clutch helical roller bearing 312 located on the right-hand helical groove 140*a* and the bottom clutch helical roller bearing 313 located on the left-hand helical groove 140*b*.

As the nose 110 and body 120 draw apart when moving from position C to position D of FIG. 3, upward vertical movement of the splined shaft 140 may cause the top clutch 150 (i.e., both the front portion 151 and rear portion 152 of the top clutch 150) to rotate a first direction (e.g., clockwise) when viewed from above. At the same time, the bottom clutch 160 (i.e., both the front portion 161 and rear portion 162 of the bottom clutch 160) may rotate a second direction (e.g., counterclockwise) when viewed from above. Conversely, as the nose 110 and body 120 of the wave-powered UUV 1000 draws together when moving from position D to position C in FIG. 3, downward vertical movement of the splined shaft 140 may cause the top clutch 150 (i.e., both the front portion 151 and rear portion 152 of the top clutch 150) to rotate the second direction (as opposed to the first direction (e.g., counterclockwise)) when viewed from above. During this time, the bottom clutch 160 (i.e., both the front portion 161 and rear portion 162 of the bottom clutch 160) may rotate a first direction (as opposed to the second direction (e.g., clockwise)) when viewed from above.

Figure 9:
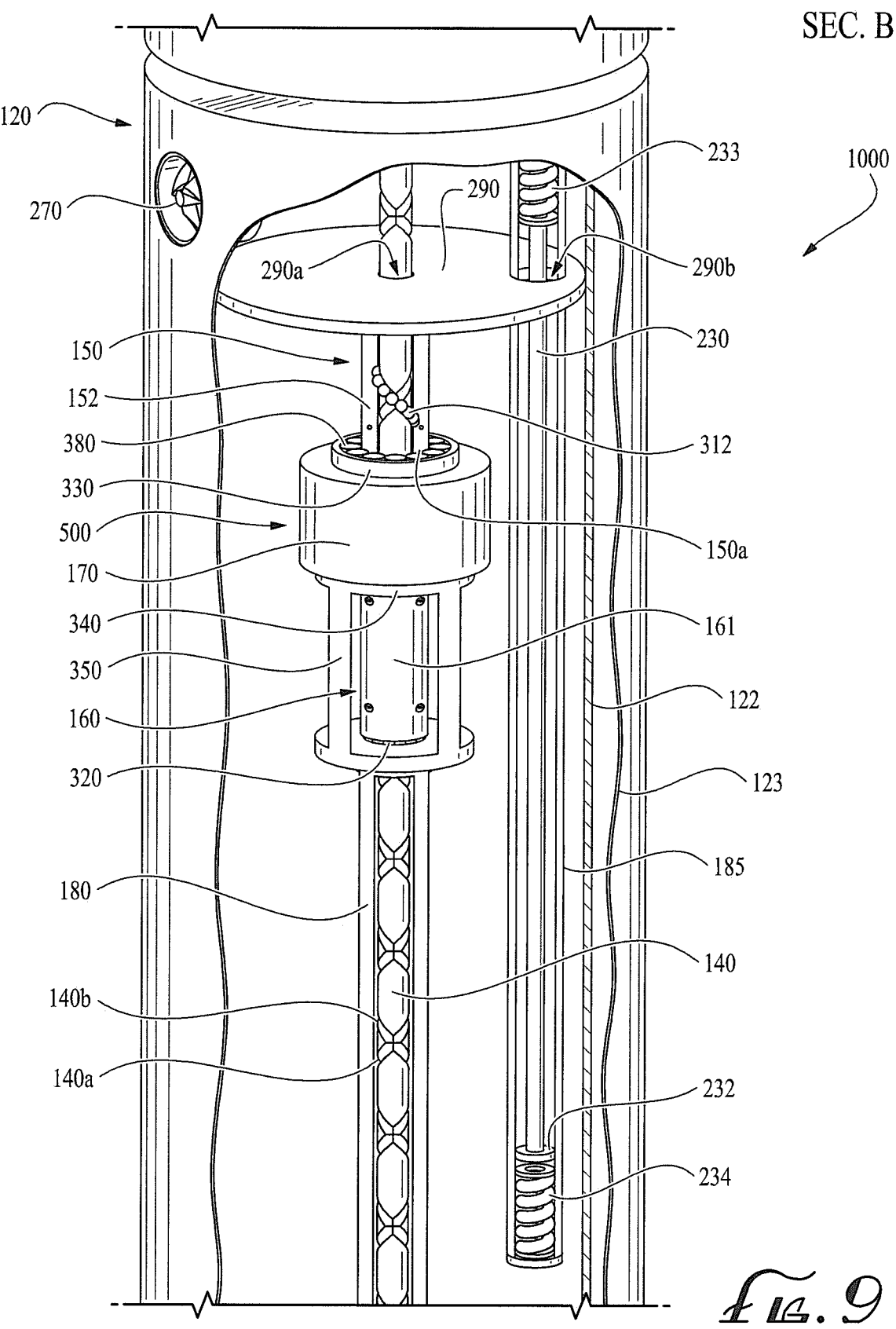
FIG. 9 is an illustration of a cutaway, top perspective view of a portion of one embodiment of the body and shows some of the inner components thereof without the front portion of the top clutch.

FIG. 9 is an illustration of a cutaway, top perspective view of a portion of one embodiment of the body 120 and shows some of the inner components of the body 120 without the front portion 151 of the top clutch 150. As shown in FIG. 9, one embodiment of the body 120 may comprise: an attitude propeller 270, buttress plate 290, guide shaft tube 185 having a top impact spring 233 and bottom impact spring 234, drivetrain 600, and LRPC 500. The drivetrain 600 may comprise a flywheel connector 350 and generator coupler 180. The LRPC 500 may comprise: rear portion 152 of the top clutch 150, top clutch sprags 380, flywheel 170 having a top clutch outer race portion 330 and bottom clutch outer race portion 340, bottom clutch 160, and bottom clutch roller bearings 320.

FIG. 9 shows the body 120 of the wave-powered UUV 1000 tilted forward without the front portion 151 of the top clutch 150 in order to display the top clutch sprags 380. Notably, FIG. 9 shows the top clutch sprags 380 rotatably disposed between the top clutch outer race portion 330 of the flywheel 170 and the top clutch inner race portion 150a of the rear portion 152 of the top clutch 150 (and the front portion 151 of the top clutch 150 when installed). Conversely, the LRPC 500 may also comprise bottom clutch sprags 382 disposed between the bottom clutch outer race portion 340 of the flywheel 170 and bottom clutch inner race portion 160a of the bottom clutch 160 (i.e., front portion 161 and rear portion 162 of the bottom clutch 160).

Notably, as the nose 110 and body 120 draw apart when moving from position C to position D and then draws together again from position D to position C, (shown in FIG. 3), the splined shaft 140 may move vertically without interference through the clearance opening 290a of the buttress plate 290. From there, the splined shaft 140 may also move along the top clutch 150 (i.e., front portion 151 and rear portion 152 of the top clutch 150), top clutch outer race portion 330 and bottom clutch outer race portion 340 of the flywheel 170, bottom clutch 160 (i.e., front portion 161 and rear portion 162 of the bottom clutch 160), and generator coupler 180 of the drivetrain 600. During this cyclical motion, the top clutch helical roller bearings 312 and the bottom clutch helical roller bearings 313 may be rotatably disposed on opposing helical grooves of the splined shaft 140. For example, the top clutch helical roller bearings 312 may be disposed within the right-hand helical groove 140a, whereas the bottom clutch helical roller bearings 313 may be disposed within the left-hand helical groove 140b (or vice versa). This may cause the top clutch 150 and bottom clutch 160 to rotate simultaneously in opposite directions. For example, when viewing the body 120 from above when the body is oriented upright as shown in FIG. 8, the top clutch 150 (or front portion 151 and rear portion 152 of the top clutch 150 together) may rotate clockwise, whereas the bottom clutch 160 (or front portion 161 and rear portion 162 of the bottom clutch 160 together) may rotate counterclockwise, or vice versa.

Importantly, in various embodiments, the top clutch sprags 380 and bottom clutch sprags 382 may be oriented to move in either direction, depending on whether the associated clutch is (1) engaged (i.e., top clutch 150 or bottom clutch 160 applies torque to the flywheel 170) or (2) overrunning (i.e., top clutch 150 or bottom clutch 160 freewheels without applying torque to the flywheel 170). In this manner, torque applied to the flywheel 170 may be configured in the same rotational direction. For example, when the nose 110 and body 120 draws apart when moving from position C to position D in FIG. 3, the top clutch 150 (i.e., front portion 151 and rear portion 152 of the top clutch 150 together) (when viewed from above) may rotate clockwise. Here, the top clutch sprags 380 is preferably oriented, such that the top clutch 150 is engaged and torque is applied to the flywheel 170 in the same clockwise direction. Conversely, at the same time, the bottom clutch 160 (i.e., front portion 161 and rear portion 162 of the bottom clutch 160 together) (when viewed from above) may rotate counterclockwise. Here the bottom clutch sprags 382 is preferably oriented, such that the bottom clutch 160 is overrunning and torque is not applied to the flywheel 170 in the counterclockwise direction.

Given the complimentary selection or orientation of the top clutch sprags 380 and bottom clutch sprags 382 (i.e., as the associated clutch is engaged or overrunning), when the nose 110 and body 120 draw together again from position D to position C, the top clutch 150 (i.e., front portion 151 and rear portion 152 of the top clutch 150 together) (when viewed from above) may rotate counterclockwise. Here, the top clutch sprags 380 is preferably oriented, such that the top clutch 150 is preferably overrunning and torque is not applied to the flywheel 170 in the same counterclockwise direction. Conversely, during this time, the bottom clutch 160 (i.e., front portion 161 and rear portion 162 of the bottom clutch 160 together) (when viewed from above) may rotate in the clockwise direction. Here the bottom clutch sprags 382 is preferably oriented, such that the bottom clutch 160 is overrunning and torque is applied to the flywheel 170 in the same clockwise direction. Accordingly, whether the nose 110 and body 120 of the wave-powered UUV 1000 draw apart when moving from position C to position D or draw together again by moving from position D to position C, as shown in FIG. 3, torque may be applied to the flywheel 170 in the clockwise direction.

Figure 10:
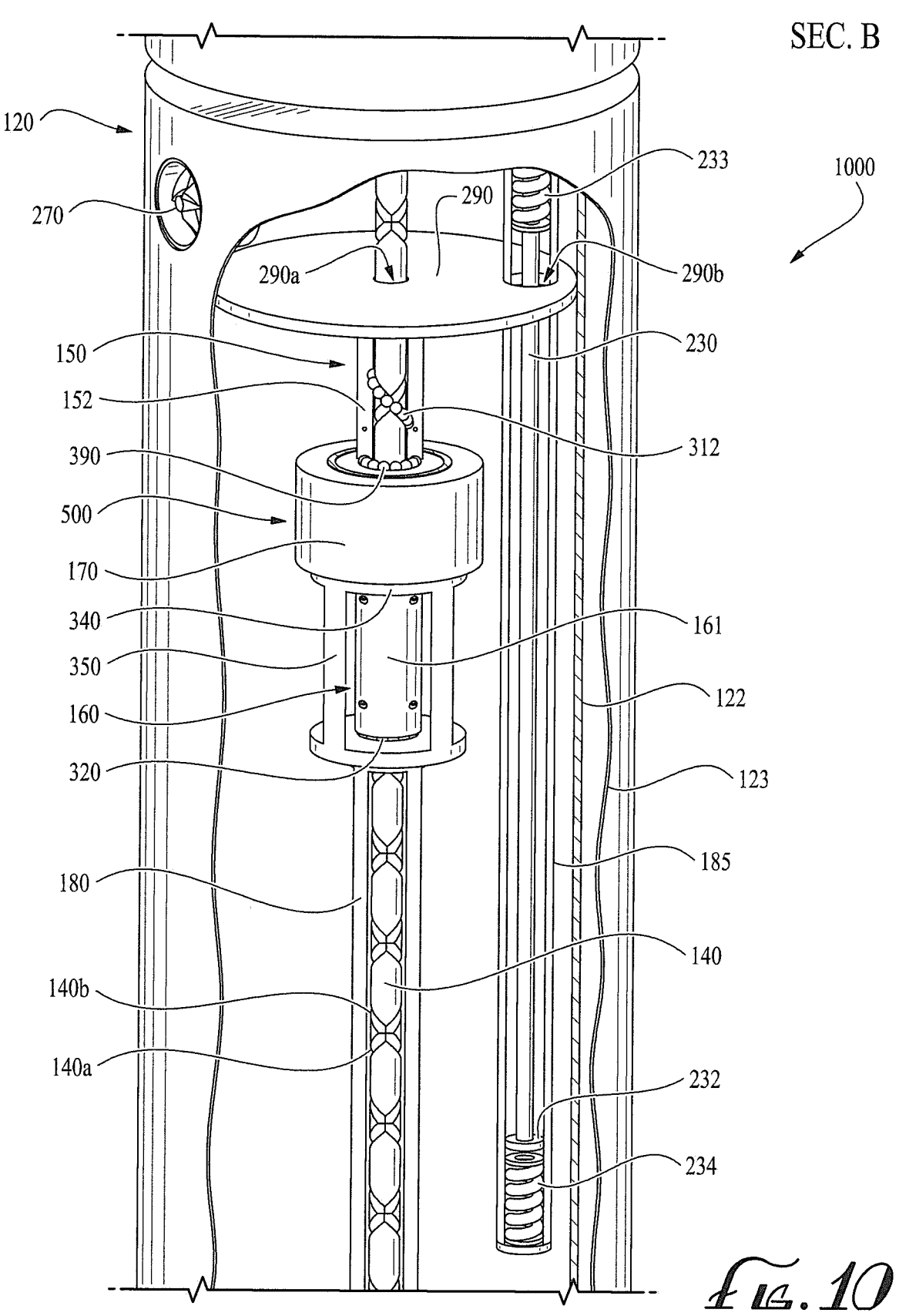
FIG. 10 is an illustration of a cutaway, top perspective view of a portion of one embodiment of the body and shows some of the inner components thereof without the front portion of the top clutch, top clutch sprags, and top clutch outer race portion.

FIG. 10 is an illustration of a cutaway, top perspective view of a portion of one embodiment of the body 120 and shows some of the inner components of the body 120 without the front portion 151 of the top clutch 150, top clutch sprags 380, and top clutch outer race portion 330. For ease of illustration, both the top clutch sprags 380 and the top clutch outer race portion 330 have been removed to reveal the flywheel top roller bearings 390. As shown in FIG. 10, the flywheel top roller bearings 390 may be rotatably engaged within a circular groove between the top clutch 150 (i.e., front portion 151 and rear portion 152) and flywheel 170. Conversely, flywheel bottom roller bearings 392 is preferably rotatably engaged within the circular groove between the bottom clutch 160 (i.e., front portion 161 and rear portion 162) and flywheel 170 (shown in FIG. 12B). As result, the flywheel top roller bearings 390 and flywheel bottom roller bearings 392 may enable the flywheel 170 to rotate once torque is applied.

Notably, the flywheel 170 may also freewheel when the flywheel 170 has stored kinetic energy and neither the top clutch sprags 380 nor the bottom clutch sprags 382 are clutch-engaged (i.e., top clutch 150 and bottom clutch 160 are overrunning). This may occur when the nose 110 and body 120 are substantially at rest relative to each other during the transitions between position D and position C.

FIG. 11 is an illustration of a cutaway, bottom perspective view of a portion of one embodiment of the body 120 and shows some of the inner components of the body 120 without the front portion 161 of the bottom clutch 160. As shown in FIG. 11, when viewing the flywheel 170 from below, the bottom clutch sprags 382 may be inserted between the bottom clutch outer race portion 340 of the flywheel 170 and the bottom clutch inner race portion 160a of the bottom clutch 160 (i.e., front portion 161 and rear portion 162 of the bottom clutch 160).

Accordingly, based on the operation above, the wave-powered UUV 1000 may operate in the following four states:

State #1: nose 110 and body 120 drawing apart with the clutch being engaged;

State #2: nose 110 and body 120 transitioning from drawing apart to rest to drawing together with the clutch overrunning and flywheel 170 freewheeling;

State #3: nose 110 and body 120 drawing together with the clutch being engaged; and State #4: nose 110 and body 120 transitioning from drawing together to rest to drawing apart with the clutch overrunning and flywheel 170 freewheeling.

Figure 12A:
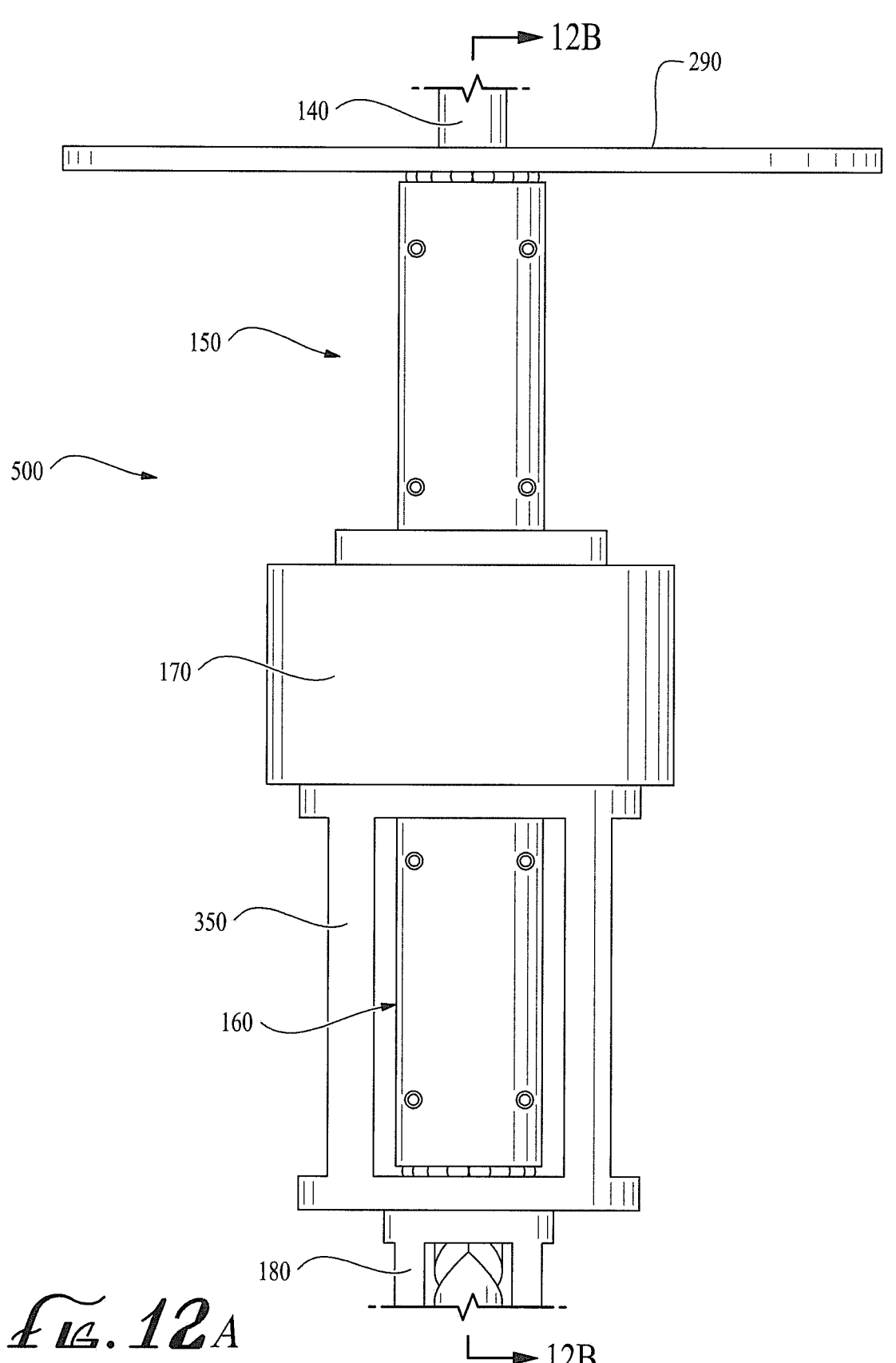
FIG. 12A is an illustration of a side elevation view of a portion of one embodiment of a linear-to-rotary power converter (LRPC).

FIG. 12A is an illustration of a side elevation view of a portion of one embodiment of an LRPC in greater detail. As shown in FIG. 12A, one embodiment of the LRPC 500 may comprise: a top clutch 150, bottom clutch 160, flywheel 170, and splined shaft 140. FIG. 12A also shows the body buttress plate 290, flywheel connector 350 and generator coupler 180.

Figure 12B:
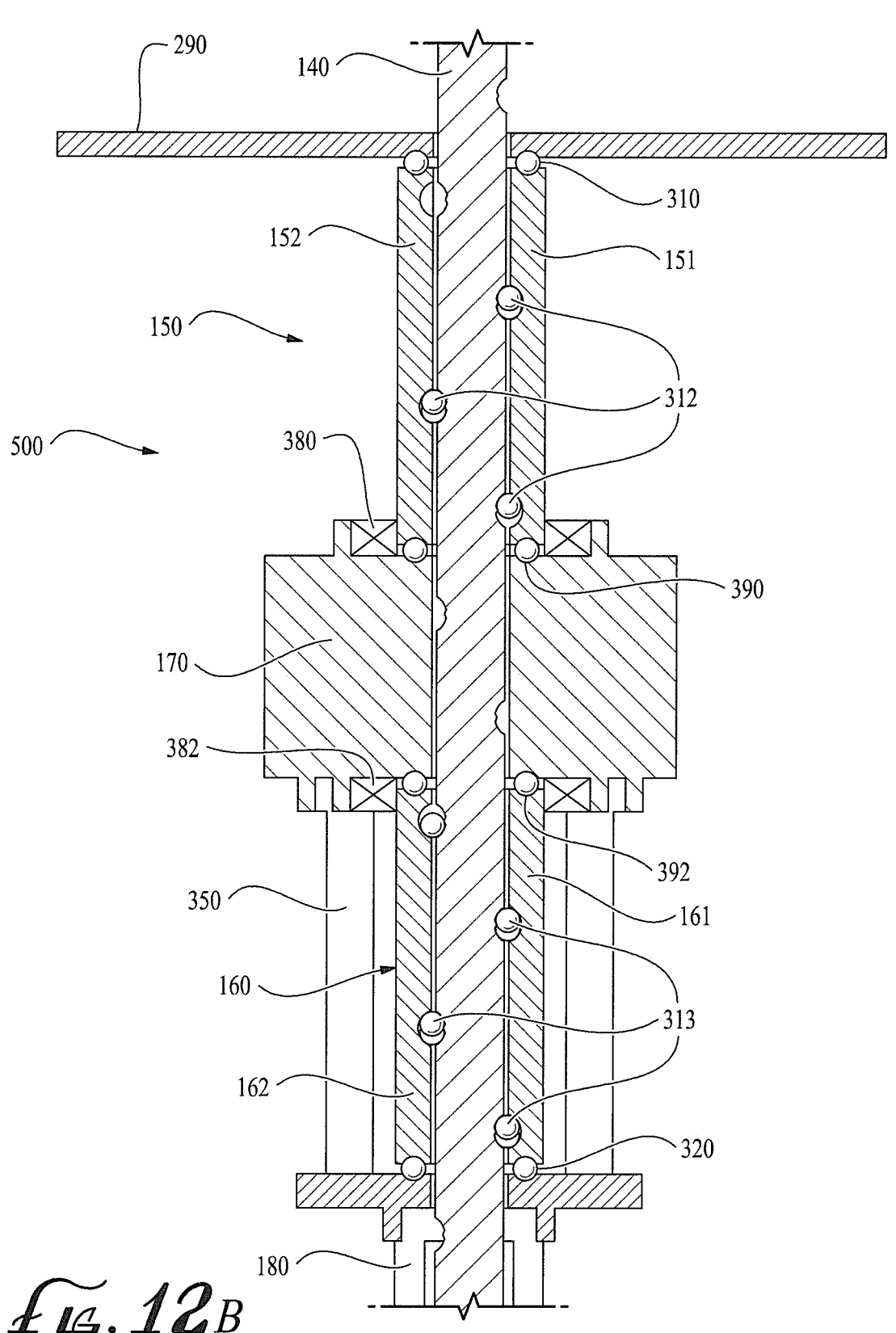
FIG. 12B is an illustration of a side elevation view of a portion of one embodiment of the LRPC taken substantially along line 12B-12B of FIG. 12A.

FIG. 12B is an illustration of a side elevation view of a portion of one embodiment of the LRPC 500 taken substantially along line 12B-12B of FIG. 12A. Here, the top clutch sprags 380 and bottom clutch sprags 382 are revealed as well as the top clutch roller bearings 310, top clutch helical roller bearings 312, flywheel top roller bearings 390; bottom clutch roller bearings 320; bottom clutch helical roller bearings 313; and flywheel bottom roller bearings 392. As shown in FIG. 12B, the flywheel bottom roller bearings 392 may be rotatably engaged within a circular groove between the bottom clutch 160 (i.e., front portion 161 and rear portion 162) and flywheel 170. Conversely, flywheel top roller bearings 390 may be rotatably engaged within the circular groove between the top clutch 150 (i.e., front portion 151 and rear portion 152) and flywheel 170. As result, the flywheel bottom roller bearings 392 and flywheel top roller bearings 390 may enable the flywheel 170 to rotate once torque is applied.

FIG. 13 is an illustration of a cutaway view of one embodiment of the aft end portion of the body 120 and shows additional inner components thereof in greater detail. As shown in FIG. 13, the body 120 may further comprise: a propeller 130, generator coupler 180 of the drivetrain 600, alternating current (AC) generator 190 having a driveshaft 192, AC-DC converter 200, battery module 210, DC motor 220, AC wire 193, and DC wires 202, 212. FIG. 13 also shows a portion of the splined shaft 140 disposed within the generator coupler 180.

The AC generator 190 may convert mechanical, rotational energy into AC voltage. The input of the AC generator 190 may be the driveshaft 192, which may be configured to rotate in order to receive the mechanical, rotational energy supplied by the drivetrain 600 of the LRPC 500 (i.e., generator coupler 180). The output of the AC generator 190 may then be an AC voltage outputted via the AC wire 193. In an exemplary embodiment, the AC generator 190 may be a variable speed three-phase AC generator such as, for example, a Northern Power 100 kilo-watt wind turbine, which may be capable of adjusting the generator torque constant. In this embodiment, the wind turbine blades may turn at the optimal angle of attack, such that wind power is converted to generator electricity at high efficiency. By analogy, in the wave-powered UUV 1000, the AC generator torque constant may be adjusted to bring the coupled oscillation of the nose and body into phase with the excitation of surface waves. This is preferably the condition for optimal efficiency in wave energy conversion.

The AC-DC converter 200 may convert the AC voltage (or current) to DC voltage (or current). Here, the input of the AC-DC converter 200 may be electrically coupled to the output of the AC generator 190 via the AC wire 193 in order to receive AC voltage. The output of the AC-DC converter 200 may be outputted as DC voltage via DC wire 202.

In various embodiments, the AC-DC converter 200 may be controlled by power electronics of a wind turbine digitally signal processor (DSP). Here, DSP control of the AC generator 190 by the AC-DC converter 200 may allow torque constant to modify the oscillation of the nose 110 relative to the body 120, as the wave-powered UUV 1000 cycles back and forth between position C and position D. In this manner, the wave energy may be converted via frequency domain control, and as a result, the AC generator 190 may perform at its highest efficiency.

The battery module 210 may serve as the power source for the wave-powered UUV 1000 and may be located within the interior region of the body 120. Importantly, the battery module 210 may comprise one or more rechargeable and dischargeable battery cells configured to hold an electrical charge. In one embodiment, the battery module 210 may comprise a single rechargeable battery cell, whereas other embodiments of the battery module 210 may comprise a plurality of rechargeable and dischargeable battery cells or unit cells mechanically connected in series or in parallel with respect to each other in order to increase charge capacity or output. Preferably, the input of the battery module 210 may be electrically coupled to the output of the AC-DC converter 200 via the DC wire 202 in order to receive DC voltage.

In some embodiments, the battery module 210 may be located near the aft end of the body 120 (or tail in other embodiments). In other embodiments, the battery module 210 may be located within the mid or forward end portion of the body 120. Embodiments of the battery module 210 may be a battery unit, module, or the like, and may include a plurality of cylindrical cavities to removably accept one or more batteries. Examples of batteries may include, without limitation, lithium ion (rechargeable), alkaline, lithium ion, nickel metal hydride (NiMH) (rechargeable), Nickel Cadmium (NiCad) (rechargeable), and the like.

The DC motor 220 may be a rotary motor configured to be operated by DC power or DC voltage and capable of converting that DC power/DC voltage into mechanical energy. Preferably, the input of the DC motor 220 may be electrically coupled to the output of the battery module 210 via the DC wire 212 in order to receive DC voltage. Also, the output of the DC motor 220 may include the propeller shaft, which may drive the propeller 130. The propeller 130, which may comprise a plurality of blades, may be configured to rotate in order to convert rotational energy into propulsive force. In various embodiments, the DC motor 220 and propeller 130 may be actuated by a navigation system of the wave-powered UUV 1000.

Figure 14:
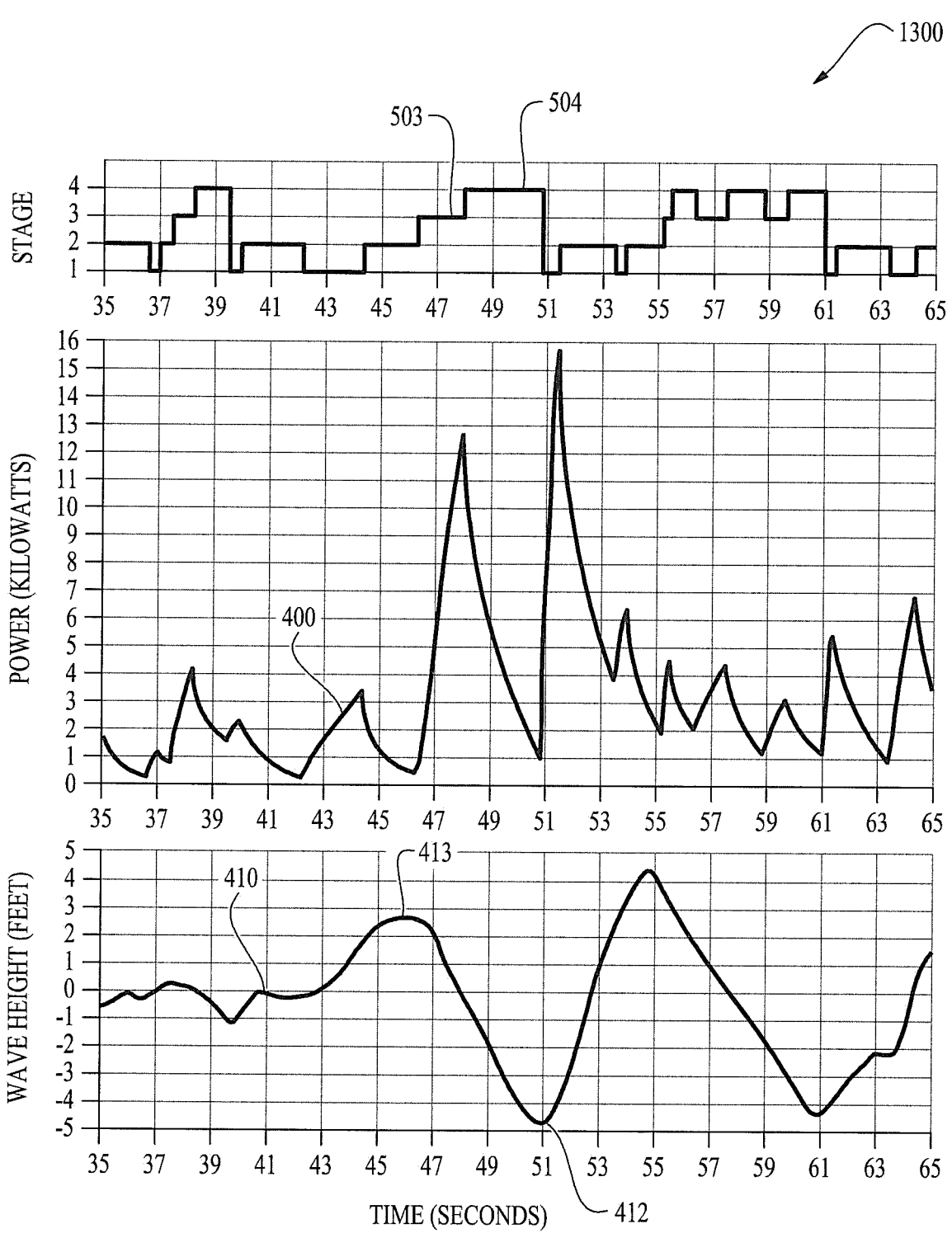
FIG. 14 is an illustration of three graphs that show the characteristic power production of the wave-powered UUV charging cycling between positions C and D of FIG. 3 beneath the ocean surface.

FIG. 14 is an illustration of three graphs that show the characteristic power production of the wave-powered UUV charging cycling between positions C and D of FIG. 3 beneath the ocean surface 300. As shown in FIG. 14, the graph 1300 may depict plots 400, 410, wherein plot 400 is associated with the power production of the wave-powered UUV 1000 and plot 410 is associated with the wave elevation of the ocean surface 300. Specifically, plot 410 is associated with the wave elevation of the ocean surface 300, such that wave crest 303 and wave trough 302 shown in FIG. 3 are both associated with the peak 413 and valley 412 of plot 410, respectively. Additionally, FIG. 14 depicts plot 400, which is associated with the characteristic power production of the wave-powered UUV 1000 in the operational state #1, state #2, state #3, or state #4.

Notably, at state 503, the nose 110 and body 120 of the wave-powered UUV 1000 are preferably drawing together. Here, the clutch may be engaged and the power production may be increasing as shown in plot 400. On the other hand, at state 504, the nose 110 and body 120 may transition from drawing together to rest and then drawing apart. Here, the clutch may be overrunning and the flywheel be freewheeling with the power production decreasing, as shown in plot 400. Importantly, FIG. 14 shows the power production being continuous, as shown in plot 400.

The foregoing description of the embodiments of the wave-powered UUV has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the wave-powered UUV are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A wave-powered unmanned undersea vehicle (UUV), comprising:
   a nose, comprising:
   a nose buttress plate; and
   a guide shaft having a first end attached to said nose buttress plate; and
   a body, comprising:
   a body buttress plate having first and second clearance openings;
   a linear-to-rotary power converter (LRPC) having a splined shaft longitudinally disposed through said first clearance opening and a drivetrain configured to rotate when said splined shaft moves in a reciprocal linear motion;

an alternating current (AC) generator having a drive shaft fixedly coupled to said drivetrain and configured to convert a rotational energy of said drivetrain into an AC voltage;

an AC-DC converter electrically coupled to said AC generator and configured to convert said AC voltage into a direct current (DC) voltage;

a battery module electrically coupled to said AC-DC converter and configured to receive and store said DC voltage from said AC-DC converter and provide said DC voltage to a battery module output;

a DC motor electrically coupled to said battery module output and configured to rotate a propeller shaft when receiving said DC voltage;

a propeller attached to said propeller shaft and configured to propel said wave-powered UUV within a body of water when said DC motor drives said propeller shaft; and a guide shaft tube, longitudinally disposed within said body and fixedly attach to said second clearance opening;

wherein a second end of said guide shaft is slidably coupled into said guide shaft tube, such that said nose and said body are in a sliding relationship; and wherein a first end of said splined shaft is attached to said nose buttress plate of said nose and is configured to move in said reciprocal linear motion having an upward stroke in a first linear direction and a downward stroke in a second linear direction opposite to said first linear direction.

2. The wave-powered UUV, according to claim 1, wherein said splined shaft includes first and second splined shaft helical grooves diametrically opposed to each other; and wherein said LRPC further comprises:
   a top clutch operably coupled to said splined shaft and configured to (1) rotate a first direction when said splined shaft performs said upward stroke and (2) rotate a second direction when said splined shaft performs said downward stroke, said top clutch having a top clutch inner race portion and a top clutch helical groove disposed therein;
   a bottom clutch operably coupled to said splined shaft and configured to (1) rotate said second direction when said splined shaft performs said upward stroke and (2) rotate said first direction when said splined shaft performs said downward stroke, said bottom clutch having a bottom clutch inner race portion and a bottom clutch helical groove disposed therein;
   top clutch helical roller bearings protruding helically inward into both said top clutch helical groove and said first splined shaft helical groove, such that said top clutch helical roller bearings are rotatably disposed between said top clutch and said splined shaft;
   bottom clutch helical roller bearings protruding helically inward into both said bottom clutch helical groove and said second splined shaft helical groove, such that said bottom clutch helical roller bearings are rotatably disposed between said bottom clutch and said splined shaft; and
   a flywheel having top and bottom clutch outer race portions on opposing sides, said top clutch outer race portion being operably coupled to said top clutch inner race portion via top clutch sprags and said bottom clutch outer race portion being operably coupled to said bottom clutch inner race portion via bottom clutch sprags, such that said flywheel is disposed adjacently between said top clutch and said bottom clutch;

wherein a first end of said drivetrain is fixedly attached to said flywheel and a second end is fixedly coupled to said drive shaft of said AC generator, such that when said flywheel rotates, said drive shaft rotates.

3. The wave-powered UUV, according to claim 2, wherein said drivetrain comprises:

a flywheel connector fixedly coupled to said flywheel; and a generator coupler having a first end fixedly coupled to said flywheel connector and a second end fixedly coupled to said drive shaft of said AC generator.

4. The wave powered UUV, according to claim 2, wherein said bottom clutch helical groove is a right-hand helical groove and wherein said top clutch helical groove is a left-hand helical groove.

5. The wave-powered UUV, according to claim 1, further comprising a splined shaft baffle having a first end portion and a second end portion, said first end portion being sealaby coupled to said nose and said second end portion being sealably coupled to said body, wherein at least a portion of said splined shaft is disposed within said splined shaft baffle; and a guide shaft baffle having a first end portion and a second end portion, said first end portion being sealably coupled to said nose and said second end portion being sealably coupled to said body, wherein at least a portion of said guide shaft is disposed within said guide shaft baffle.

6. The wave-powered UUV, according to claim 1, further comprising:

a journal bearing coupled to said guide shaft tube and slidably engaged with said guide shaft;

a first impact spring disposed within a first end portion of said guide shaft tube; and a second impact spring disposed within the second end portion of said guide shaft tube;

wherein a second end of said guide shaft comprises an end stop disposed between said first impact spring and said second impact spring within said guide shaft tube, such that said end stop is configured to contact said first impact spring when said nose is substantially away from said body and contact said second impact spring when said nose is close or adjacent to said body.

7. The wave-powered UUV, according to claim 1, further comprising:

an attitude motor, an attitude propeller operably coupled to said attitude motor; and an attitude control system configured to actuate said attitude propeller and attitude motor in order to adjust an attitude of said wave-powered UUV when said wave-powered UUV is maneuvering in said body of water.

8. A wave-powered UUV, comprising:

a nose, comprising:

a nose buttress plate;

first and second shaft tubes, each having a first end attached to said nose buttress plate and an open second end; and a guide shaft having a first end attached to said nose buttress plate and disposed within said second shaft tube;

a body, comprising:

a hull, substantially elongate and having a fore end and an aft end;

a body buttress plate disposed near said fore end of said hull and having first and second clearance openings;

an LRPC having a splined shaft longitudinally disposed through said first clearance opening and a drivetrain configured to rotate when said splined shaft moves in a reciprocal linear motion;

an AC generator having a drive shaft operably coupled to said drive train and configured to convert a rotational energy of said drivetrain into an AC voltage;

an AC-DC converter electrically coupled to said AC generator and configured to convert said AC voltage into a DC voltage;

a battery module electrically coupled to said AC-DC converter and configured to receive and store said DC voltage from said AC-DC converter and provide said DC voltage to a battery module output;

a DC motor electrically coupled to said battery module output and configured to rotate a propeller shaft when receiving said DC voltage;

a propeller coupled to said propeller shaft and configured to propel said wave-powered UUV within a body of water when said DC motor drives said propeller shaft; and a guide shaft tube, longitudinally disposed within said body and fixedly attach to said second clearance opening;

wherein a second end of said guide shaft is slidably coupled to guide shaft tube, such that said nose and said body are in a sliding relationship; and wherein a first end of said splined shaft is attached to said nose buttress plate of said nose and disposed within said first shaft tube, said splined shaft being movable in a reciprocal linear motion having an upward stroke in a first linear direction and a downward stroke in a second linear direction opposite to said first linear direction.

9. The wave-powered UUV, according to claim 8, wherein said splined shaft includes first and second splined shaft helical grooves diametrically opposed to each other; and wherein said LRPC further comprises:

a top clutch operably coupled to said splined shaft and configured to (1) rotate a first direction when said splined shaft performs said upward stroke and (2) rotate a second direction when said splined shaft performs said downward stroke, said top clutch having a top clutch inner race portion and a top clutch helical groove disposed therein;

a bottom clutch operably coupled to said splined shaft and configured to (1) rotate said second direction when said splined shaft performs said upward stroke and (2) rotate said first direction when said splined shaft performs said downward stroke, said bottom clutch having a bottom clutch inner race portion and a bottom clutch helical groove disposed therein;

top clutch helical roller bearings protruding helically inward into both said top clutch helical groove and said first splined shaft helical groove, such that said top clutch helical roller bearings are rotatably disposed between said top clutch and said splined shaft;

bottom clutch helical roller bearings protruding helically inward into both said bottom clutch helical groove and said second splined shaft helical groove, such that said bottom clutch helical roller bearings are rotatably disposed between said bottom clutch and said splined shaft; and a flywheel having top and bottom clutch outer race portions on opposing sides, said top clutch outer race portion being operably coupled to said top clutch inner race portion via top clutch sprags and said bottom clutch outer race portion being operably coupled to said bottom clutch inner race portion via bottom clutch sprags, such that said flywheel is disposed adjacently between said top clutch and said bottom clutch;

wherein a first end of said drivetrain is fixedly attached to said flywheel and a second end is fixedly coupled to said drive shaft of said AC generator, such that when said flywheel rotates, said drive shaft rotates.

10. The wave-powered UUV, according to claim 9, wherein said drivetrain comprises:

a flywheel connector fixedly coupled to said flywheel; and
a generator coupler having a first end fixedly coupled to said flywheel connector and a second end fixedly coupled to said drive shaft of said AC generator.

11. The wave powered UUV, according to claim 8, wherein said bottom clutch helical groove is a right-hand helical groove and wherein said top clutch helical groove is a left-hand helical groove.

12. The wave-powered UUV, according to claim 8, further comprising a splined shaft baffle having a first end portion and a second end portion, said first end portion being sealaby coupled to said nose and disposed within said first shaft tube and said second end portion being sealably coupled to said body, wherein at least a portion of said splined shaft is disposed within said splined shaft baffle and a guide shaft baffle having a first end portion and a second end portion, said first end portion being sealably coupled to said nose and disposed within said second shaft tube and said second end portion being sealably coupled to said body, wherein at least a portion of said guide shaft is disposed within said guide shaft baffle.

13. The wave-powered UUV, according to claim 8, further comprising:

a journal bearing coupled to said guide shaft tube and slidably engaged with said guide shaft;
a first impact spring disposed within a first end portion of said guide shaft tube; and
a second impact spring disposed within the second end portion of said guide shaft tube;
wherein a second end of said guide shaft comprises an end stop disposed between said first impact spring and said second impact spring within said guide shaft tube, such that said end stop is configured to contact said first impact spring when said nose is substantially away from said body and contact said second impact spring when said nose is close or adjacent to said body.

14. The wave-powered UUV, according to claim 8, further comprising:

an attitude motor,
an attitude propeller operably coupled to said attitude motor; and
an attitude control system configured to actuate said attitude propeller and attitude motor in order to adjust an attitude of said wave-powered UUV when said wave-powered UUV is maneuvering in said body of water.

15. A wave-powered UUV, comprising:
a nose, comprising:
a nose buttress plate;
first and second shaft tubes, each having a first end attached to said nose buttress plate and an open second end; and a guide shaft having a first end attached to said nose buttress plate and disposed within said second shaft tube; and
a body, comprising:
a hull, substantially elongate and having a fore end and an aft end, said hull, comprising an inner hull and an outer hull;
a ballast control system disposed between said inner hull and said outer hull;
a body buttress plate disposed near a fore end portion of said hull and having first and second clearance openings;
an LRPC having a splined shaft longitudinally disposed through said first clearance opening and a drivetrain configured to rotate when said splined shaft moves in a reciprocal linear motion, said LRPC being configured to convert reciprocating linear energy from said splined shaft to continuous rotational energy at said drivetrain;
an AC generator having a drive shaft operably coupled to said drivetrain and configured to convert said continuous rotational energy into an AC voltage;
an AC-DC converter electrically coupled to said AC generator and configured to convert said AC voltage into a DC voltage;
a battery module electrically coupled to said AC-DC converter and configured to receive and store said DC voltage from said AC-DC converter and provide said DC voltage to a battery module output;
a DC motor electrically coupled to said battery module output and configured to rotate a propeller shaft when receiving said DC voltage;
a propeller operably coupled to said propeller shaft and configured to propel said wave-powered UUV within a body of water when said DC motor drives said propeller shaft; and
a guide shaft tube, longitudinally disposed within said body and fixedly attach to said second clearance opening;
wherein a second end of said guide shaft is slidably coupled to guide shaft tube, such that said nose and said body are in a sliding relationship;
wherein a first end of said splined shaft is attached to said nose buttress plate of said nose and disposed within said first shaft tube, said splined shaft being movable in a reciprocal linear motion having an upward stroke in a first linear direction and a downward stroke in a second linear direction opposite to said first linear direction; and
wherein said nose is adapted to buoy said body to rise and fall with respect to said nose under an influence of said body of water.

16. The wave-powered UUV, according to claim 15, wherein said splined shaft includes first and second splined shaft helical grooves diametrically opposed to each other; and
wherein said LRPC further comprises:
a top clutch operably coupled to said splined shaft and configured to (1) rotate a first direction when said splined shaft performs said upward stroke and (2) rotate a second direction when said splined shaft performs said downward stroke, said top clutch having a top clutch inner race portion and a top clutch helical groove disposed therein;
a bottom clutch operably coupled to said splined shaft and configured to (1) rotate said second direction when said splined shaft performs said upward stroke and (2) rotate said first direction when said splined shaft performs said downward stroke, said bottom clutch having a bottom clutch inner race portion and a bottom clutch helical groove disposed therein;

top clutch helical roller bearings protruding helically inward into both said top clutch helical groove and said first splined shaft helical groove, such that said top clutch helical roller bearings are rotatably disposed between said top clutch and said splined shaft;

bottom clutch helical roller bearings protruding helically inward into both said bottom clutch helical groove and said second splined shaft helical groove, such that said bottom clutch helical roller bearings are rotatably disposed between said bottom clutch and said splined shaft; and a flywheel having top and bottom clutch outer race portions on opposing sides, said top clutch outer race portion being operably coupled to said top clutch inner race portion via top clutch sprags and said bottom clutch outer race portion being operably coupled to said bottom clutch inner race portion via bottom clutch sprags, such that said flywheel is disposed adjacently between said top clutch and said bottom clutch;

wherein a first end of said drivetrain is fixedly attached to said flywheel and a second end is fixedly coupled to said drive shaft of said AC generator, such that when said flywheel rotates, said drive shaft rotates.

17. The wave-powered UUV, according to claim 16, wherein said drivetrain comprises:

a flywheel connector fixedly coupled to said flywheel; and a generator coupler having a first end fixedly coupled to said flywheel connector and a second end fixedly coupled to said drive shaft of said AC generator.

18. The wave powered UUV, according to claim 16, wherein said bottom clutch helical groove is a right-hand helical groove and wherein said top clutch helical groove is a left-hand helical groove.

19. The wave-powered UUV, according to claim 15, further comprising:

a splined shaft baffle having a first end portion and a second end portion, said first end portion being sealaby coupled to said nose and disposed within said first shaft tube and said second end portion being sealably coupled to said body, wherein at least a portion of said splined shaft is disposed within said splined shaft baffle; and a guide shaft baffle having a first end portion and a second end portion, said first end portion being sealably coupled to said nose and disposed within said second shaft tube and said second end portion being sealably coupled to said body, wherein at least a portion of said guide shaft is disposed within said guide shaft baffle.

20. The wave-powered UUV, according to claim 15, further comprising:

a journal bearing coupled to said guide shaft tube and slidably engaged with said guide shaft;

a first impact spring disposed within a first end portion of said guide shaft tube; and a second impact spring disposed within the second end portion of said guide shaft tube;

wherein a second end of said guide shaft comprises an end stop disposed between said first impact spring and said second impact spring within said guide shaft tube, such that said end stop is configured to contact said first impact spring when said nose is substantially away from said body and contact said second impact spring when said nose is close or adjacent to said body.

* * * * *